US011902500B2

(12) United States Patent
Karafin et al.

(10) Patent No.: US 11,902,500 B2
(45) Date of Patent: Feb. 13, 2024

(54) LIGHT FIELD DISPLAY SYSTEM BASED DIGITAL SIGNAGE SYSTEM

(71) Applicant: Light Field Lab, Inc., San Jose, CA (US)

(72) Inventors: Jonathan Sean Karafin, Morgan Hill, CA (US); Brendan Elwood Bevensee, San Jose, CA (US); John Dohm, Beverly Hills, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/638,093

(22) PCT Filed: Aug. 9, 2019

(86) PCT No.: PCT/US2019/046030
§ 371 (c)(1),
(2) Date: Feb. 10, 2020

(87) PCT Pub. No.: WO2021/029859
PCT Pub. Date: Feb. 18, 2021

(65) Prior Publication Data
US 2021/0044795 A1 Feb. 11, 2021

(51) Int. Cl.
*H04N 13/368* (2018.01)
*H04N 13/398* (2018.01)
(Continued)

(52) U.S. Cl.
CPC ......... *H04N 13/368* (2018.05); *G03H 1/0005* (2013.01); *G03H 1/2249* (2013.01);
(Continued)

(58) Field of Classification Search
CPC .. H04N 13/368; H04N 13/398; H04N 13/383; H04R 1/02; H04R 2499/15;
(Continued)

(56) References Cited

U.S. PATENT DOCUMENTS

| 5,187,360 A | 2/1993 | Pasco |
| 5,374,976 A | 12/1994 | Spannenburg |

(Continued)

FOREIGN PATENT DOCUMENTS

| CN | 102231044 A | 11/2011 |
| CN | 102591124 A | 7/2012 |

(Continued)

OTHER PUBLICATIONS

PCT International Search Report and Written Opinion, PCT Application No. PCT/US2019/046030, dated Dec. 20, 2019, 21 pages.
(Continued)

*Primary Examiner* — Tung T Vo

(57) ABSTRACT

A light field (LF) display system presents holographic content to one or more viewers in a public setting for digital signage applications. In some embodiments, the LF display system includes a sensory feedback assembly, a tracking system and/or a viewer profiling module. The sensory feedback assembly may comprise sensory feedback devices that provide sensory feedback to viewers of the LF display system in tandem with the presented holographic content. The tracking system may comprise cameras used to track the viewers of the LF display system. Based on a viewer's tracked position and/or tracked gaze, the LF display system may generate holographic content that is perceivable by certain viewers but not viewable by others. The viewer profiling module may identify each viewer for providing personalized holographic content and may further monitor and record behavior of viewers for informing subsequent presentations of holographic content by the LF display system.

10 Claims, 13 Drawing Sheets

(51) Int. Cl.
*H04N 13/383* (2018.01)
*H04R 1/02* (2006.01)
*G06F 3/14* (2006.01)
*G03H 1/22* (2006.01)
*G03H 1/00* (2006.01)

(52) U.S. Cl.
CPC ......... *G03H 1/2294* (2013.01); *G06F 3/1446* (2013.01); *H04N 13/383* (2018.05); *H04N 13/398* (2018.05); *H04R 1/02* (2013.01); *G03H 2001/0055* (2013.01); *G03H 2001/0061* (2013.01); *H04R 2499/15* (2013.01)

(58) Field of Classification Search
CPC .... H04R 2217/03; H04R 19/02; H04R 1/403; G06F 3/1446; G06F 3/013; G03H 1/2294; G03H 1/0005; G03H 1/2249; G03H 2001/0061; G03H 2001/0055; G03H 2226/05; G03H 3/00; G02B 30/10; G02B 2027/0138; G02B 2027/014; G02B 27/0093; G09G 2320/028; G09G 3/003
USPC .......................................................... 348/40
See application file for complete search history.

(56) References Cited

U.S. PATENT DOCUMENTS

| | | |
|---|---|---|
| 5,481,385 A | 1/1996 | Zimmerman et al. |
| 5,822,125 A | 10/1998 | Meyers |
| 6,556,280 B1 | 4/2003 | Kelsey et al. |
| 6,680,761 B1 | 1/2004 | Greene et al. |
| 7,151,849 B1* | 12/2006 | Camahort ............... G03H 1/268 382/154 |
| 7,329,982 B2 | 2/2008 | Conner et al. |
| 8,149,265 B2 | 4/2012 | Smalley et al. |
| 8,442,397 B2 | 5/2013 | Kang et al. |
| 8,743,466 B2 | 6/2014 | Yamamoto |
| 8,953,012 B2 | 2/2015 | Williams et al. |
| 9,179,134 B2 | 11/2015 | Ranieri et al. |
| 10,416,762 B2* | 9/2019 | Kim ....................... G09G 3/342 |
| 10,432,919 B2 | 10/2019 | Lapstun |
| 10,560,689 B2 | 2/2020 | Lapstun |
| 10,698,221 B2* | 6/2020 | Vieira ................ G02B 27/0172 |
| 10,764,552 B2* | 9/2020 | Perreault ............. H04N 13/383 |
| 2003/0030912 A1 | 2/2003 | Gleckman et al. |
| 2004/0108806 A1 | 6/2004 | Cok et al. |
| 2004/0135100 A1 | 7/2004 | Menon et al. |
| 2005/0243275 A1 | 11/2005 | Curatu |
| 2005/0260677 A1 | 11/2005 | Saaski |
| 2006/0028400 A1 | 2/2006 | Lapstun et al. |
| 2006/0191566 A1 | 8/2006 | Schaafsma |
| 2007/0285554 A1* | 12/2007 | Givon .................... H04N 13/204 348/340 |
| 2008/0144174 A1 | 6/2008 | Lucente et al. |
| 2008/0170293 A1 | 7/2008 | Lucente et al. |
| 2008/0192313 A1 | 8/2008 | Matsumura et al. |
| 2008/0231926 A1* | 9/2008 | Klug .................... H04N 13/327 359/23 |
| 2008/0297593 A1 | 12/2008 | Debevec et al. |
| 2009/0040294 A1 | 2/2009 | Smalley et al. |
| 2010/0278480 A1 | 11/2010 | Vasylyev |
| 2011/0012895 A1 | 1/2011 | Lucente et al. |
| 2011/0032329 A1 | 2/2011 | Bauza et al. |
| 2011/0128555 A1 | 6/2011 | Rotschild et al. |
| 2011/0134040 A1 | 6/2011 | Duparre et al. |
| 2012/0057040 A1 | 3/2012 | Park et al. |
| 2012/0206726 A1 | 8/2012 | Pervez et al. |
| 2012/0268950 A1 | 10/2012 | Parkyn et al. |
| 2012/0300044 A1 | 11/2012 | Thomas et al. |
| 2013/0016176 A1* | 1/2013 | Hines ...................... H04N 7/14 348/E7.083 |
| 2013/0022222 A1* | 1/2013 | Zschau ................ G03H 1/2294 381/306 |
| 2013/0027512 A1 | 1/2013 | Aronsson et al. |
| 2013/0063550 A1* | 3/2013 | Ritchey ............ G06F 16/90335 348/36 |
| 2013/0069933 A1 | 3/2013 | Smithwick et al. |
| 2013/0076930 A1 | 3/2013 | Border et al. |
| 2013/0147838 A1* | 6/2013 | Small ...................... G06F 3/013 345/633 |
| 2013/0163089 A1 | 6/2013 | Bohn |
| 2013/0195410 A1 | 8/2013 | Karbasivalashani et al. |
| 2013/0208328 A1* | 8/2013 | Chae .................... G03H 1/2286 359/11 |
| 2013/0216123 A1 | 8/2013 | Shroff et al. |
| 2013/0265485 A1 | 10/2013 | Kang |
| 2014/0035959 A1 | 2/2014 | Lapstun |
| 2014/0126322 A1 | 5/2014 | Cipolla et al. |
| 2014/0132694 A1 | 5/2014 | Shacham et al. |
| 2014/0184496 A1 | 7/2014 | Gribetz et al. |
| 2014/0192087 A1 | 7/2014 | Frost |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0300839 A1* | 10/2014 | Choe ...................... G02B 30/26 349/15 |
| 2014/0320530 A1 | 10/2014 | Gruber et al. |
| 2014/0371353 A1 | 12/2014 | Mitchell et al. |
| 2015/0016777 A1 | 1/2015 | Abovitz et al. |
| 2015/0178939 A1 | 6/2015 | Bradski et al. |
| 2015/0201186 A1* | 7/2015 | Smithwick ........... G03H 1/2294 348/52 |
| 2015/0219940 A1 | 8/2015 | Kim et al. |
| 2015/0241608 A1 | 8/2015 | Shian et al. |
| 2015/0277378 A1 | 10/2015 | Smithwick et al. |
| 2015/0331241 A1 | 11/2015 | Haddick |
| 2016/0014395 A1 | 1/2016 | Murray et al. |
| 2016/0037146 A1 | 2/2016 | McGrew |
| 2016/0070059 A1 | 3/2016 | Chen et al. |
| 2016/0139402 A1 | 5/2016 | Lapstun |
| 2016/0170372 A1 | 6/2016 | Smithwick |
| 2016/0179205 A1* | 6/2016 | Katz ....................... G06F 3/017 345/156 |
| 2016/0180511 A1 | 6/2016 | Zhou et al. |
| 2016/0205394 A1 | 7/2016 | Meng et al. |
| 2016/0274539 A1 | 9/2016 | Smithwick |
| 2016/0282614 A1 | 9/2016 | Zagolla et al. |
| 2016/0282808 A1 | 9/2016 | Smalley |
| 2016/0327905 A1* | 11/2016 | Gioia .................... H04N 19/647 |
| 2016/0327906 A1* | 11/2016 | Futterer ................. G03H 1/02 |
| 2016/0360187 A1 | 12/2016 | Smithwick et al. |
| 2017/0068213 A1* | 3/2017 | Rhee ...................... G06F 3/011 |
| 2017/0094265 A1* | 3/2017 | Mullins .................. G02F 1/332 |
| 2017/0122725 A1 | 5/2017 | Yeoh et al. |
| 2017/0150108 A1* | 5/2017 | Kong ................... A63B 24/0087 |
| 2017/0169659 A1 | 6/2017 | Froy |
| 2017/0208292 A1* | 7/2017 | Smits ................... H04N 13/257 |
| 2017/0214972 A1 | 7/2017 | Lapstun |
| 2017/0289530 A1 | 10/2017 | Smithwick et al. |
| 2017/0293259 A1* | 10/2017 | Ochiai ................. G03H 1/0005 |
| 2018/0024628 A1* | 1/2018 | Kim ..................... G03H 1/2286 345/156 |
| 2018/0063519 A1* | 3/2018 | Smithwick ............. H04N 13/32 |
| 2018/0084245 A1 | 3/2018 | Lapstun |
| 2018/0253884 A1* | 9/2018 | Burnett, III .......... H04N 13/398 |
| 2018/0284692 A1 | 10/2018 | Kline et al. |
| 2018/0321500 A1* | 11/2018 | Chen .................... G02B 5/1819 |
| 2018/0323972 A1 | 11/2018 | Reed et al. |
| 2019/0011700 A1* | 1/2019 | Reiner ..................... G03H 1/04 |
| 2019/0043447 A1* | 2/2019 | Chung ................. G06F 3/04815 |
| 2019/0212700 A1* | 7/2019 | An ........................... G02B 5/30 |
| 2019/0259320 A1 | 8/2019 | Lapstun |
| 2019/0317451 A1* | 10/2019 | Supikov ................. G06K 9/4661 |
| 2019/0377301 A1* | 12/2019 | Leister ................. G03H 1/0808 |
| 2020/0225737 A1* | 7/2020 | Limor .................... G06F 3/011 |
| 2020/0228790 A1* | 7/2020 | Rakshit ................ H04N 13/383 |
| 2020/0264560 A1* | 8/2020 | Chen .................... G03H 1/2294 |
| 2020/0290513 A1* | 9/2020 | Karafin .................. G06F 3/016 |
| 2020/0296327 A1* | 9/2020 | Karafin ................. H04N 13/189 |
| 2020/0314415 A1* | 10/2020 | Karafin ................. H04N 13/363 |
| 2020/0333609 A1* | 10/2020 | Leister .................... G03H 1/02 |
| 2021/0223738 A1* | 7/2021 | Futterer .................. G03H 1/32 |

(56) References Cited

U.S. PATENT DOCUMENTS

FOREIGN PATENT DOCUMENTS

| CN | 103616770 A | 3/2014 |
| --- | --- | --- |
| CN | 103777455 A | 5/2014 |
| CN | 105334690 A | 2/2016 |
| GB | 2550134 A | 11/2017 |
| JP | 2009530661 A | 8/2009 |
| WO | 2008048360 A2 | 4/2008 |
| WO | WO 2014/188149 A1 | 11/2014 |
| WO | WO 2016/046514 A1 | 3/2016 |
| WO | 2017127897 A1 | 8/2017 |
| WO | WO 2018/014009 A1 | 1/2018 |
| WO | WO 2018/014010 A1 | 1/2018 |
| WO | WO 2018/014027 A1 | 1/2018 |
| WO | WO 2018/014036 A1 | 1/2018 |
| WO | WO 2018/014040 A1 | 1/2018 |
| WO | WO 2018/014044 A1 | 1/2018 |
| WO | WO 2018/014045 A2 | 1/2018 |
| WO | WO 2018/014046 A1 | 1/2018 |
| WO | WO 2018/014047 A1 | 1/2018 |
| WO | WO 2018/014048 A2 | 1/2018 |
| WO | WO 2018/014049 A1 | 1/2018 |

OTHER PUBLICATIONS

PCT Invitation to Pay Additional Fees, PCT Application No. PCT/US2019/046030, dated Oct. 17, 2019, 2 pages.
PCT International Search Report and Written Opinion, PCT Application No. PCT/US17/42275, dated Dec. 4, 2017, 21 pages.
PCT International Search Report and Written Opinion, PCT Application No. PCT/US17/42276, dated Nov. 24, 2017, 14 pages.
PCT International Search Report and Written Opinion, PCT Application No. PCT/US17/42418, dated Dec. 20, 2017, 11 pages.
PCT International Search Report and Written Opinion, PCT Application No. PCT/US17/42452, dated Nov. 17, 2017, ten pages.
PCT International Search Report and Written Opinion, PCT Application No. PCT/US17/42462, dated Oct. 30, 2017, eight pages.
PCT International Search Report and Written Opinion, PCT Application No. PCT/US17/42466, dated Nov. 28, 2017, 12 pages.
PCT International Search Report and Written Opinion, PCT Application No. PCT/US17/42467, dated Dec. 27, 2017, seven pages.
PCT International Search Report and Written Opinion, PCT Application No. PCT/US17/42468, dated Nov. 27, 2017, 11 pages.
PCT International Search Report and Written Opinion, PCT Application No. PCT/US17/42469, dated Oct. 12, 2017, ten pages.
PCT International Search Report and Written Opinion, PCT Application No. PCT/US17/42470, dated Dec. 28, 2017, 18 pages.
PCT International Search Report and Written Opinion, PCT Application No. PCT/US17/42679, dated Nov. 9, 2017, eight pages.
Wetzstein, G. et al., "On Plenoptic Multiplexing and Reconstruction," International Journal on Computer Vistion (IJCV), vol. 101, No. 2, Nov. 5, 2013, pp. 384-400.
Anonymous: "Kinect—Wikipedia", Dec. 20, 2018 (Dec. 20, 2018), pp. 1-25, XP93039425, Retrieved from the Internet: URL:https://web.archive.org/web/2018122015 2750/https://en.Wikipedia.org/wiki/Kinect [retrieved on Apr. 17, 2023].
EP-19941170.3 Partial Search Report of the European Patent office dated May 3, 2023.
Sun et al., "Synthesis of light-field raw data from RGB-D images", 2015 IEEE International Conference On Image Processing (ICIP), IEEE, Sep. 27, 2015, (Sep. 27, 2015), pp. 1448-1452.
AU-2017297629 Notice of Acceptance dated Jul. 26, 2018.
AU-2018256628 Examination Report No. 1 dated Jul. 1, 2019.
CN201780043946.8 First Office Action of the Chinese Patent Office dated Dec. 22, 2020.
CN201780043946.8 Second Office Action of the Chinese Patent Office dated Sep. 15, 2021.
EA-201892637 Office Action of the Eurasian Patent Office dated Mar. 6, 2020.
EA-202193101 Notification of the Search Report of the Eurasian Patent Office dated Sep. 16, 2022.
EP-17828632.4 European Partial Search Report of European Patent Office dated Feb. 10, 2020.
International Search Report and Written Opinion of PCT/US2017/042470 dated Dec. 28, 2017.
NZ-743813 First Examination Report dated Sep. 14, 2018.

\* cited by examiner

LIGHT FIELD DISPLAY SYSTEM BASED DIGITAL SIGNAGE SYSTEM

CROSS REFERENCE TO RELATED APPLICATIONS

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates to signage systems, and specifically relates to light field display (LF) based signage systems.

Conventional signage systems present visual content to one or more viewers of the signage system. Conventional signage systems may be generally categorized into digital signage systems and physical signage systems. Conventional physical signage systems are generally constructed with physical objects which may be either two-dimensional (2-D) or three-dimensional (3-D), e.g., paper signs, billboards, digital electronic displays, 3-D blocked letters, 3-D sculptures, etc. However, many conventional physical signage systems have difficulty presenting dynamic content that is variable in real time. For example, a physical signage system cannot present a trailer to a movie with only the ability to present a poster of the movie. Conventional digital signage systems are generally constructed with digital display screens that can only present 2-D visual content to one or more viewers. In general, conventional signage system can only present common visual content that is viewable from all vantage points with direct line of sight of the conventional signage system. In other words, all viewers of a conventional signage system see the same visual content at an instance in time, perhaps from different perspectives.

SUMMARY

A light field (LF) display system for digital signage applications. The LF display system for digital signage applications is configured to present holographic content to one or more viewers in a public setting. The public setting may be any common area populated by the one or more viewers. Holographic content provided in digital signage applications may include holographic information panels, holographic representations of physical merchandise, holographic advertisements, holographic movies or video, etc.

The LF display system comprises a controller and a LF display assembly. The controller is configured to generate holographic content. The LF display assembly comprises one or more LF display modules that are configured to present the holographic content in a holographic object volume to a viewer located in a viewing volume in a public setting.

The LF display system has a tracking system that includes one or more cameras for tracking movement of viewers within a viewing volume of the LF display system. The LF display system determines that a viewer is within the viewing volume based in part on the tracked movement. In response to the determination that the viewer is within the viewing volume, a LF display assembly of the LF display system via one or more LF display modules presents holographic content in a holographic object volume viewable by the viewer in the viewing volume.

In some embodiments, the LF display system generates display instructions for a holographic object based in part on a set of parameters. The one or more light LF display modules present the holographic object within a viewing volume according to the display instructions, wherein the holographic object is a real image. The LF display system may further record behavior of each viewer that can inform subsequent selections of holographic objects to provide to each viewer. In other embodiments, the LF display system may further identify individual viewers within the viewing volume. The LF display system may generate display instructions further based on the identified viewers. The LF display system may also receive one or more inputs from viewers. The LF display system may update display instructions based on tracking information and/or received inputs to modify presentation of the holographic object. The LF display assembly then presents a modified holographic object according to the updated display instructions with the LF display modules.

Figure 1:
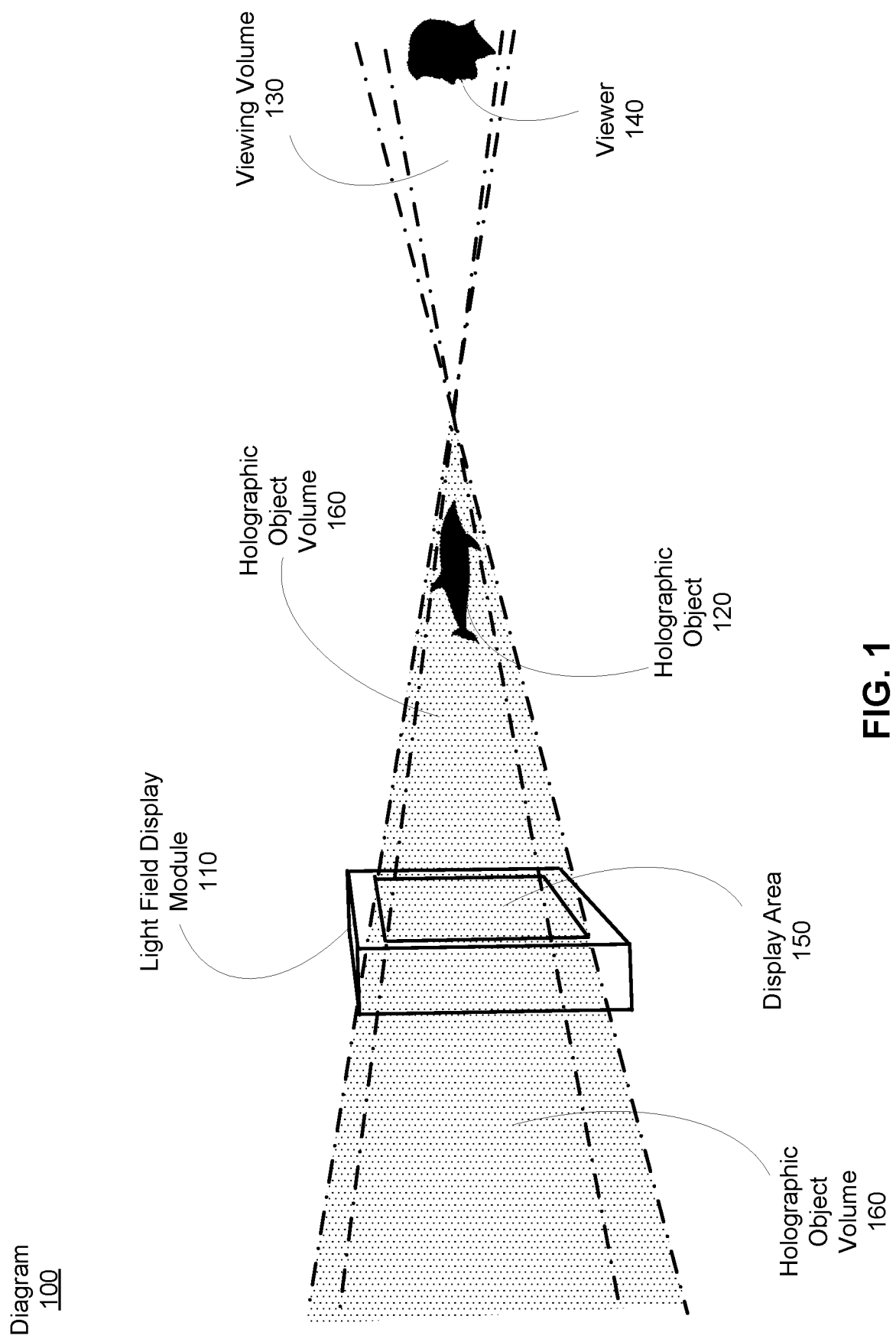
FIG. 1 is a diagram of a light field display module presenting a holographic object, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A light field (LF) display system is implemented as or as a component of a signage system to present one or more viewers of the signage system with holographic content. Holographic content may include one or more holographic objects and may also include any combination of other visual content (e.g., two-dimensional or three-dimensional visual content) or sensory feedback content. A holographic object comprises a two-dimensional (2-D) object, a three-dimensional (3-D) object, or both that is generated with one or more four-dimensional (4-D) light field functions. Holographic content provided in signage applications may include holographic information panels, holographic representations of physical merchandise, holographic advertisements, holographic movies or video, holographic stories, etc. The LF display system comprises a LF display assembly. The LF display system has one or more LF display modules that are configured to present holographic content to one or more viewers in a viewing volume of the LF display system. The holographic content provided by the LF display system may also be used to convey information to one or more viewers of the signage system.

In some embodiments, the LF display system has a sensory feedback assembly, a tracking system, a viewer profiling module, or any combination thereof. The sensory feedback assembly contains one or more sensory feedback devices that provide sensory feedback content to one or more viewers of the LF display system in tandem with the holographic content presented by the LF display assembly. Sensory feedback potentially encompasses tactile feedback, audio feedback, wind feedback, and temperature feedback to augment the holographic content presented to the viewers of the LF display system. The tracking system contains one or more cameras that are used to track the viewers of the LF display system. Tracking may involve monitoring a position of one or more viewers within the viewing volume of the LF display system or tracking a gaze of the viewers (i.e., monitoring a response of the viewer). In one embodiment, the LF display system may determine an occurrence of an impression based on the monitored response of the viewer. For example, the viewers gaze may be used to determine an impression of the viewer as a response, e.g., to a holographic object. Based on a viewer's position and gaze, the LF display system may generate holographic content that is perceivable by one or more viewers in a portion of the viewing volume but not viewable by others outside the portion. The viewer profiling module identifies each viewer for providing personalized holographic content to each viewer. The viewer profiling module may further monitor and record behavior of viewers to holographic content for informing subsequent presentations of holographic content by the LF display system.

In some embodiments, the LF display system is implemented in large scale signage systems. The LF display system may be sized to be larger than an average viewer. For example, the LF display system may be implemented as a billboard to present holographic content to one or more viewers passing by the LF display system. The LF display system may be placed next to a driveway, a walkway, or a combination thereof. The LF display system may be placed on one or more sides of a building, on one or more sides of a transit vehicle, on the interior walls of an organization or a business, on a welcome desk of an organization or a business, on a directory kiosk of an organization or a business, on one or more signs in a public place (e.g., a billboard, a poster, etc.), or on any other surface located in a public setting that could be used for digital signage. The viewers may include drivers or passengers in a vehicle and/or pedestrians. The LF display system may use the tracking system and the viewer profiling module to record impressions of holographic content to viewers. In some embodiments, the LF display system is implemented in small-scale signage systems. The LF display system may be sized similarly to that of any average viewer. The LF display system may present holographic content to one or more viewers. Similarly, the LF display system may use the tracking system and the viewer profiling module to record impressions of holographic content to viewers. Additionally, the viewer profiling module can record behavior of the viewers to the presented holographic content to update holographic content preferences for each viewer.

Light Field Display System Overview

FIG. 1 is a diagram 100 of a LF display module 110 presenting a holographic object 120, in accordance with one or more embodiments. The LF display module 110 is part of a LF display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell, temperature, etc.). For example, as discussed below, the projection of focused ultrasonic sound waves may generate a mid-air tactile sensation that can simulate a surface of some or all of a holographic object. The LF display system includes one or more LF display modules 110, and is discussed in detail below with regard to FIGS. 4A-4F, 6, and 7.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide layer to a region in space in accordance with one or more four-dimensional (4-D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in more detail below with regard to FIGS. 2A-3B.

The LF display module 110 generates holographic objects within a holographic object volume 160 using one or more 4-D light field functions (e.g., derived from a 5-D plenoptic function). The holographic objects can be three-dimensional (3-D), two-dimensional (2-D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the surface of the display area 150 (i.e., towards the viewer 140) such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within a viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small—such that it is designed for a single viewer. In other embodiments, as discussed in detail below with regard to, e.g., FIGS. 4A-4F, 6, and 7, the LF display modules may be enlarged and/or tiled to create larger holographic object volumes and corresponding viewing volumes that can accommodate a large range of viewers (e.g., one to thousands). The LF display modules presented in this disclosure may be built so that the full surface of the LF display contains holographic imaging optics, with no inactive or dead space, and without any need for bezels. In these embodiments, the LF display modules may be tiled so that the imaging area is continuous across the seam between LF display modules, and the bond line between the tiled modules is virtually undetectable using the visual acuity of the eye. Notably, in some configurations, some portion of the display surface may not include holographic imaging optics, although they are not described in detail herein.

The flexible size and/or shape of a viewing volume 130 allows for viewers to be unconstrained within the viewing volume 130. For example, a viewer 140 can move to a different position within a viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different views of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device, nor be confined to a particular position, in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface. The seamless display surface has an effective display area that is larger than the display areas of the individual LF display modules. Some embodiments relating to tiling LF display modules are discussed below with regard to FIGS. 4A-4F, 6, and 7. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content in the holographic object volume 160 behind the plane of the display area 150. For example, the LF display module 110 may make the display area 150 appear to be a surface of the ocean that the holographic object 120 is jumping out of. And the displayed content may be such that the viewer 140 is able to look through the displayed surface to see marine life that is under the water.

Moreover, the LF display system can generate content that seamlessly moves around the holographic object volume 160, including behind and in front of the plane of the display area 150.

Figure 2A:
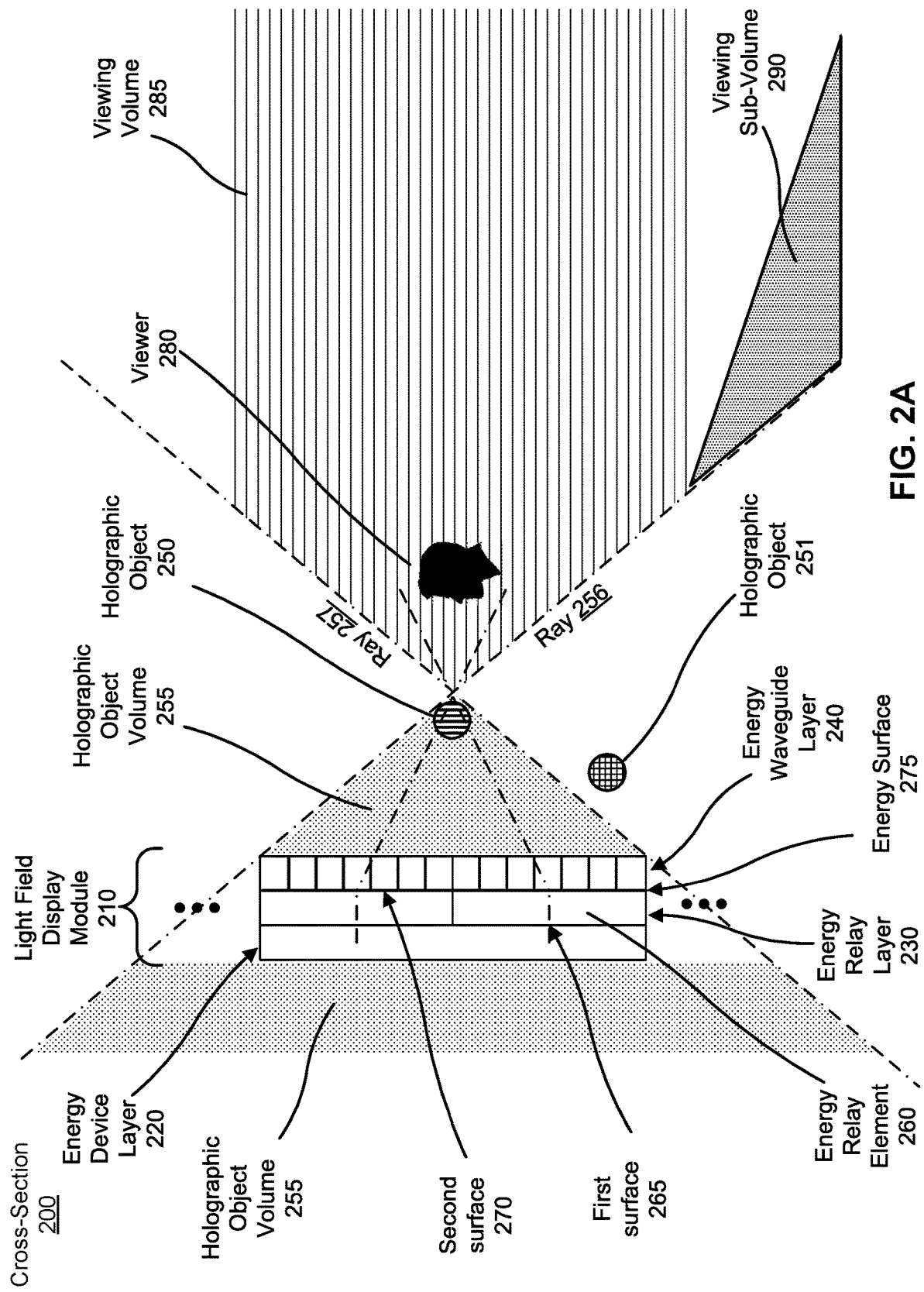
FIG. 2A is a cross section of a portion of a light field display module, in accordance with one or more embodiments.

FIG. 2A illustrates a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as projection locations for emitted energy. The directed energy from the display surface enables convergence of many rays of energy, which, thereby, can create holographic objects. For visible light, for example, the LF display will project a very large number of light rays from the projection locations that may converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewing perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The energy device layer 220 may be configured to provide a plurality of energy source locations. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., at a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor may be sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

In some configurations, the energy relay layer 230 relays energy (e.g., electromagnetic energy, mechanical pressure waves, etc.) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having, for example, 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiency relayed between these surfaces without any significant loss in resolution.

The energy waveguide layer 240 comprises a plurality of energy waveguides, wherein each waveguide may be configured to project energy from at least one energy source location into at least one specific direction from a display surface depending on the energy source location, in accordance with a 4-D light field function, to form the holographic objects. The energy propagation direction (or path) is defined by two angular dimensions determined at least by the energy surface coordinate location relative to the waveguide. The waveguide is associated with a spatial 2-D coordinate. Together, these four coordinates form a 4-D energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4-D light field function to form the holographic object 250 within the holographic object volume 255. In some embodiments, the viewing perspective of the holographic object 250 may change based in part on a viewer's position in the viewing volume 285 relative to the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface that may be perceived by a user, but these could be other projected rays. The rays define the field of view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., the viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
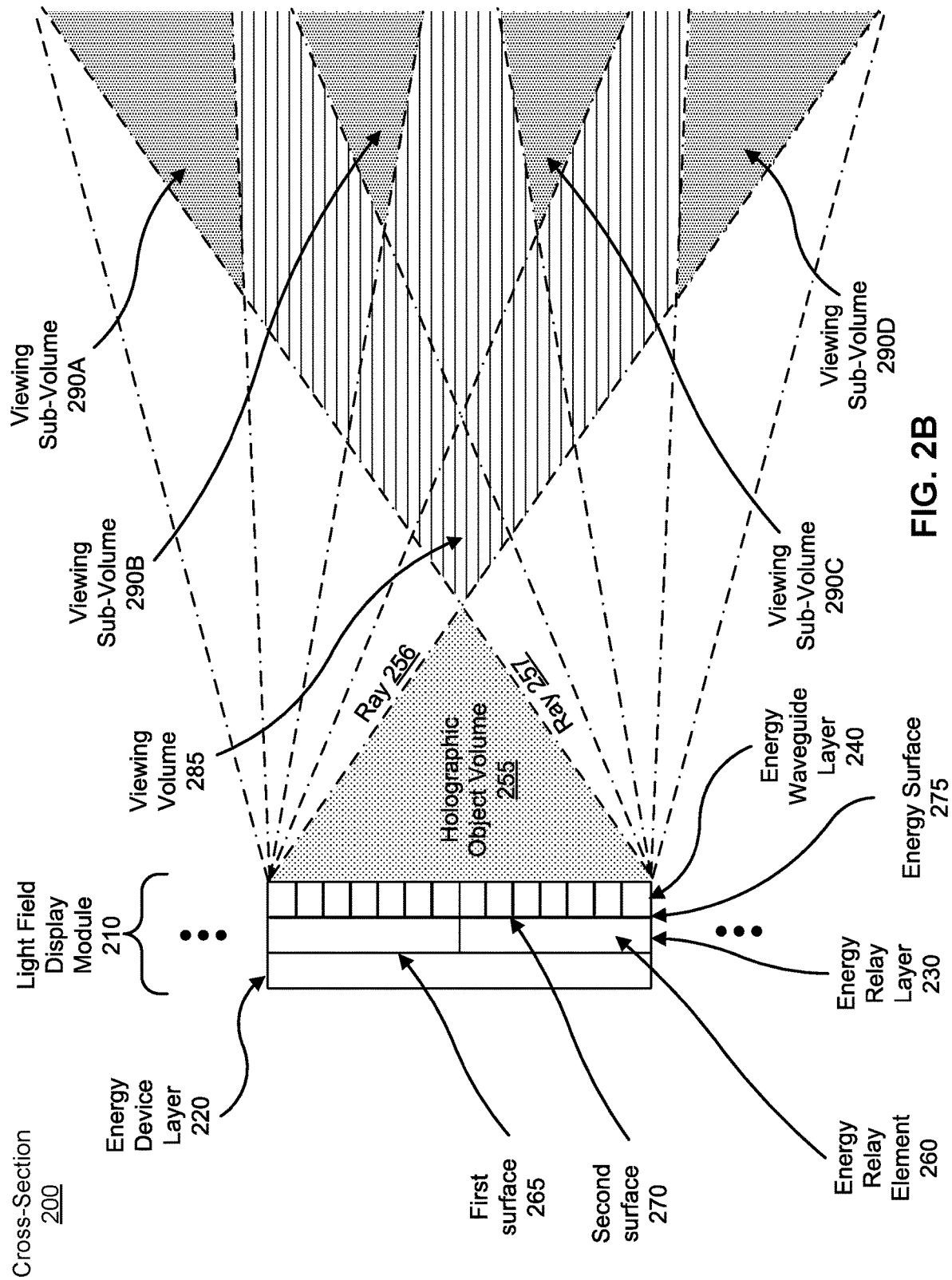
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by a LF display system in other example holographic object volumes. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4-D light field function. Moreover, as the viewer 280 moves within the viewing volume 285 he/she would also see different perspectives of the holographic object 250 as would other viewers within the viewing volume 285. As will be appreciated by one of ordinary skill in the art, a 4-D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 may include two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, with no energy relay layer, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
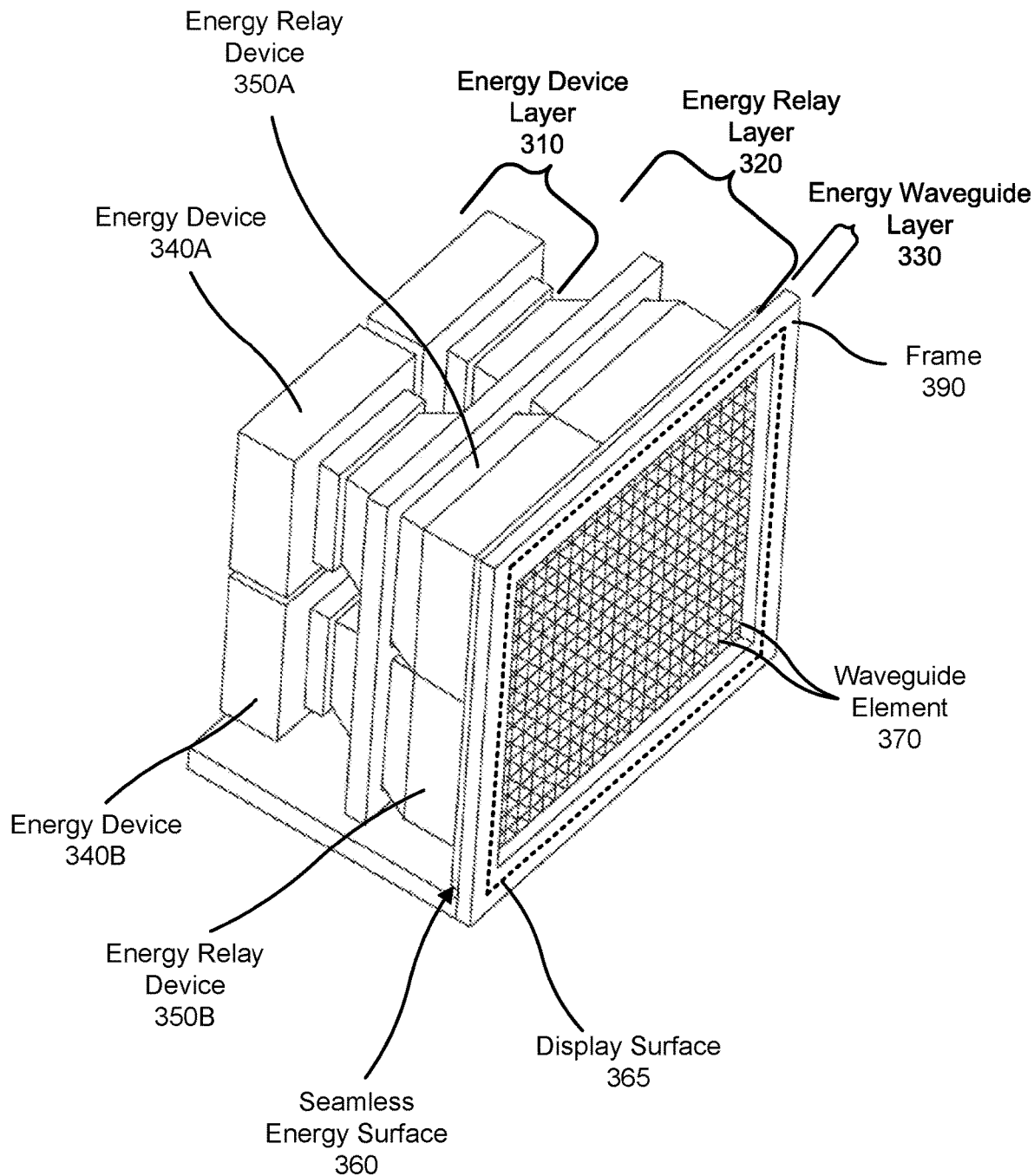
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay devices 350 (three are visible in the figure). The energy relay devices 350 may all relay the same type of energy (e.g., light), or may relay one or more different types (e.g., light and sound). Each of the relay devices 350 includes a first surface and a second surface, the second surface of the energy relay devices 350 being arranged to form a singular seamless energy surface 360. In the illustrated embodiment, each of the energy relay devices 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of LF display module 300A together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4-D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface 360 or in the energy waveguide layer 330, and allow the projection of an energy field in additional to the light field. In one embodiment, an acoustic energy field may be projected from electrostatic speakers (not illustrated) mounted at any number of locations, e.g., as an array, on the seamless energy surface 360. In one embodiment, the array of electrostatic speakers is coupled to the plurality of energy waveguides. The array of electrostatic speakers comprise at least one transparent membrane configured to generate acoustic energy when driven and a plurality of electrodes configured to acoustically drive the transparent membrane. Each electrode may be located between one or more energy waveguides. Further, the electrostatic speakers of the LF display module 300A are positioned within the LF display module 300A such that the dual-energy surface simultaneously projects sound fields and holographic content. For example, the electrostatic speakers may be formed with one or more diaphragm elements that are transmissive to some wavelengths of electromagnetic energy, and driven with one or more conductive elements (e.g., planes which sandwich the one or more diaphragm elements). The electrostatic speakers may be mounted on to the seamless energy surface 360, so that the diaphragm elements cover some of the waveguide elements. The conductive electrodes of the speakers may be collocated with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between electromagnetic waveguide elements, and/or collocated with structures designed to inhibit light transmission between electromagnetic waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under any particular waveguide element 370 are all energy sources, all energy sensors, or a mix of energy sources and energy sensors.

Figure 3B:
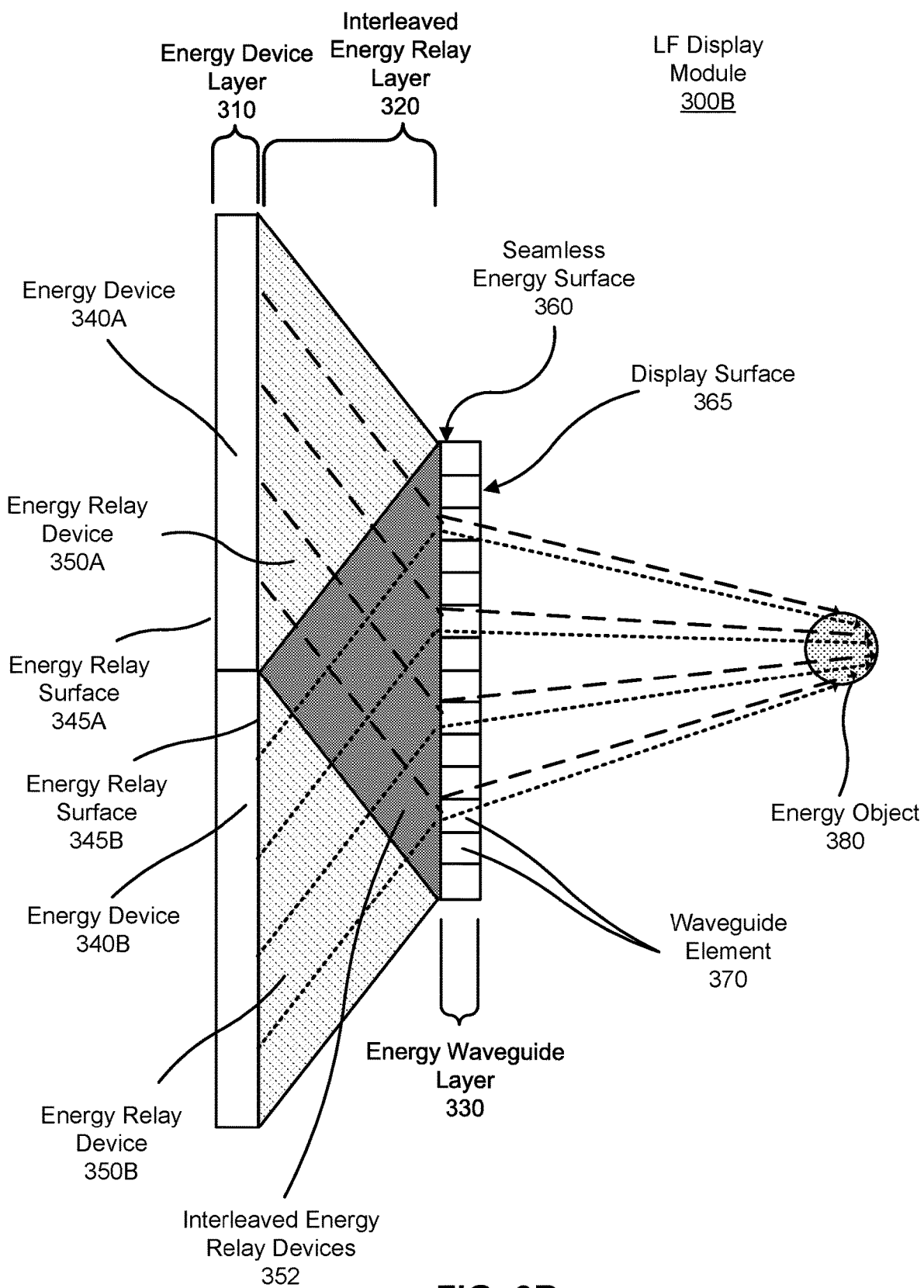
FIG. 3B is a cross-sectional view of a light field display module, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay device 350B transports energy between the energy relay first surface 345B connected to energy device 340B, and the seamless energy surface 360. Both relay devices are interleaved at interleaved energy relay device 352, which is connected to the seamless energy surface 360. In this configuration, seamless energy surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 300B may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regard to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 300B that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area in FIG. 3B. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side (i.e., the front side), of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source (e.g., energy device 340A) and an imaging sensor is used as an energy sensor (e.g., energy device 340B). In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field from projection locations on the display surface to the front of the display surface and capture a light field from an area in front of the display surface at the projection locations. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 300B may be configured such that the locations at the seamless energy surface 365 that are under a particular waveguide element 370 are all emissive display locations, all imaging sensor locations, or some combination of these locations. In other embodiments, the bidirectional energy surface can project and receive various other forms of energy.

In another example embodiment of the LF display module 300B, the LF display module is configured to project two different types of energy. For example, in an embodiment, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the LF display module 300B with interleaved energy relay devices may include multiple energy device layers with each energy device layer including a specific type of energy device. In these examples, the energy relay layers are configured to relay the appropriate type of energy between the seamless energy surface 360 and the energy device layer 310.

Tiled LF Display Modules

Figure 4A:
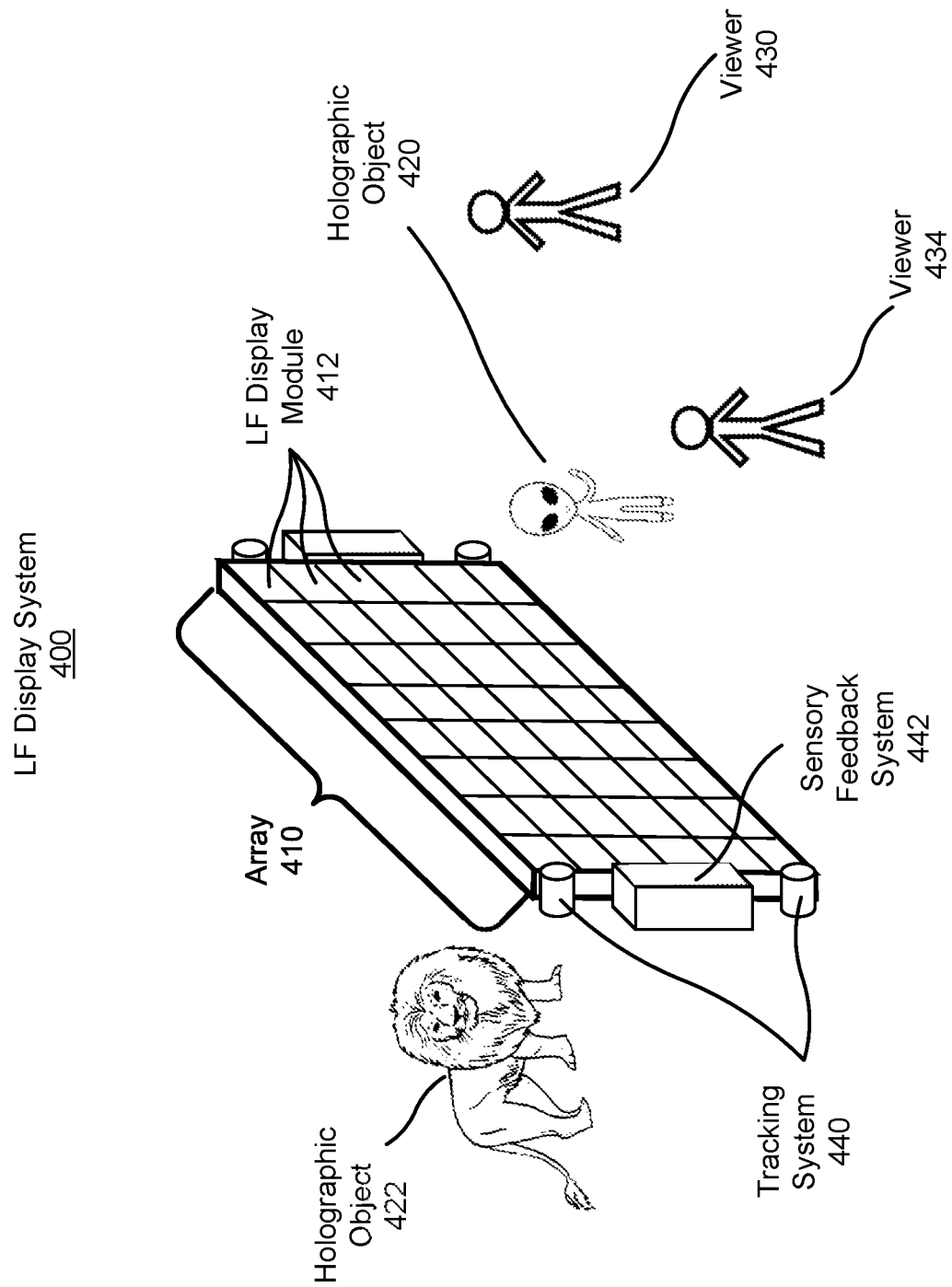
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The LF display module 412 may be the same as LF display module 300A or 300B. The array 410 may cover, for example, some or all of a surface (e.g., a wall) of a room. The LF array may cover other surfaces, such as, for example, a table top, a billboard, a rotunda, a panel, etc.

The array 410 may project one or more holographic objects. For example, in the illustrated embodiment, the array 410 projects a holographic object 420 and a holographic object 422. Tiling of the LF display modules 412 allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 420. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 430 and the viewer 434 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 presents holographic content to a viewer 430 (i.e., a first viewer) and a viewer 434 (i.e., a second viewer). The first viewer and second viewer may be located in different viewing volumes. For example, the first viewer may be located in a viewing volume and the second viewer may be located in a second viewing volume. The LF display system 400 presents additional holographic content in the holographic object volume of the array 410 to the second viewer located in the second viewing volume different from the viewing volume. In some embodiments, the LF display system 400 presents holographic content that is viewable from the viewing volume but not viewable from the second viewing volume.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems used to gather information about one or more viewers of the LF display system, including responses of the viewers to the holographic content projected by the LF display system 400, and characteristics of the viewers of the LF display system 400. For example, in the illustrated embodiment of FIG. 4A, LF display system includes a tracking system 440 that is external to the array 410. Here, the tracking system may be a camera system coupled to the array 410. External tracking systems are described in more detail in regard to FIG. 5A. In other example embodiments, the tracking system may be incorporated into the array 410 as described herein. For example, an energy device (e.g., energy device 340) of one or more LF display modules 412 containing a bidirectional energy surface included in the array 410 may be configured to capture images of viewers in front of the array 410. In whichever case, the tracking system(s) of the LF display system 400 determines tracking information about the viewers (e.g., viewer 430 and/or viewer 434) viewing holographic content presented by the array 410. In one embodiment, the tracking system(s) of the LF display system 400 tracks movement of the viewers, and one or more viewing volumes may be defined by the tracked movement.

In some embodiments, the LF display system 400 may identify an opportunity to present holographic content to the viewer of the LF display system 400 based on the determination that the viewer 430 is within the viewing volume. The tracking system 440 may track the movements of the viewer 430 within a viewing volume of the LF display system 400 and may determine the viewer 430 is within the viewing volume based on the tracked movements. In other embodiments, the LF display system 400 may select the holographic content from a content store (i.e., where holographic content is stored on a third party system or on an online store) and the holographic content may comprise a set of parameters which define when and how to present holographic content. The set of parameters may be derived in part from responses or characteristics of one or more viewers determined by the tracking system. For example, if the ages of one or more viewers are determined, then content appropriate for a particular age range may be shown. In another example, depending on the position or motion of tracked viewers, the frequency of presenting the holographic content may be adjusted. In general, the tracking system may provide parameters that describe when or how to present holographic content, or some combination thereof. The LF display system 400 may generate display instructions for the holographic content based on the set of parameters and may present the holographic content to one or more viewers based on the set of parameters. The display instructions instruct the LF display system 400 when and how to display holographic content.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions, motions, or gestures of the viewer 430 and/or the viewer 434 as described herein. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. Similarly, the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their position relative to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments the LF display system 400 may include one or more sensory feedback systems. The sensory feedback systems provide other sensory stimuli (e.g., tactile, audio, or smell) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regard to FIG. 5A. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system 442 that includes one or more acoustic projection devices external to the array. Alternatively or additionally, the LF display system 400 may include one or more acoustic projection devices integrated into the array 410 as described herein. The acoustic projection devices may consist of an array of ultrasonic sources (e.g., an ultrasonic energy projection device or a volumetric tactile projection device) configured to project a volumetric tactile surface. In one embodiment, the ultrasonic energy projection device may provide tactile feedback with the holographic object. The ultrasonic energy projection device may generate a volumetric tactile surface in proximity to a surface of the holographic object or coincident to a surface of the holographic object. In some embodiments, the tactile surface may be coincident with a holographic object (e.g., at a surface of the holographic object 420) for one or more surfaces of a holographic object if a portion of a viewer gets within a threshold distance of the one or more surfaces. The holographic content may be a representation of a physical item with a texture and the volumetric tactile projection device may simulate the texture of the physical item (i.e., provide a volumetric tactile surface). The volumetric tactile sensation may allow the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 422 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIGS. 2A-2B. This can limit the amount of perceived immersion that a viewer will experience with a single wall display unit. One way to address this is to use multiple LF display modules that are tiled along multiple sides as described below with respect to FIG. 4B-4F.

Figure 4B:
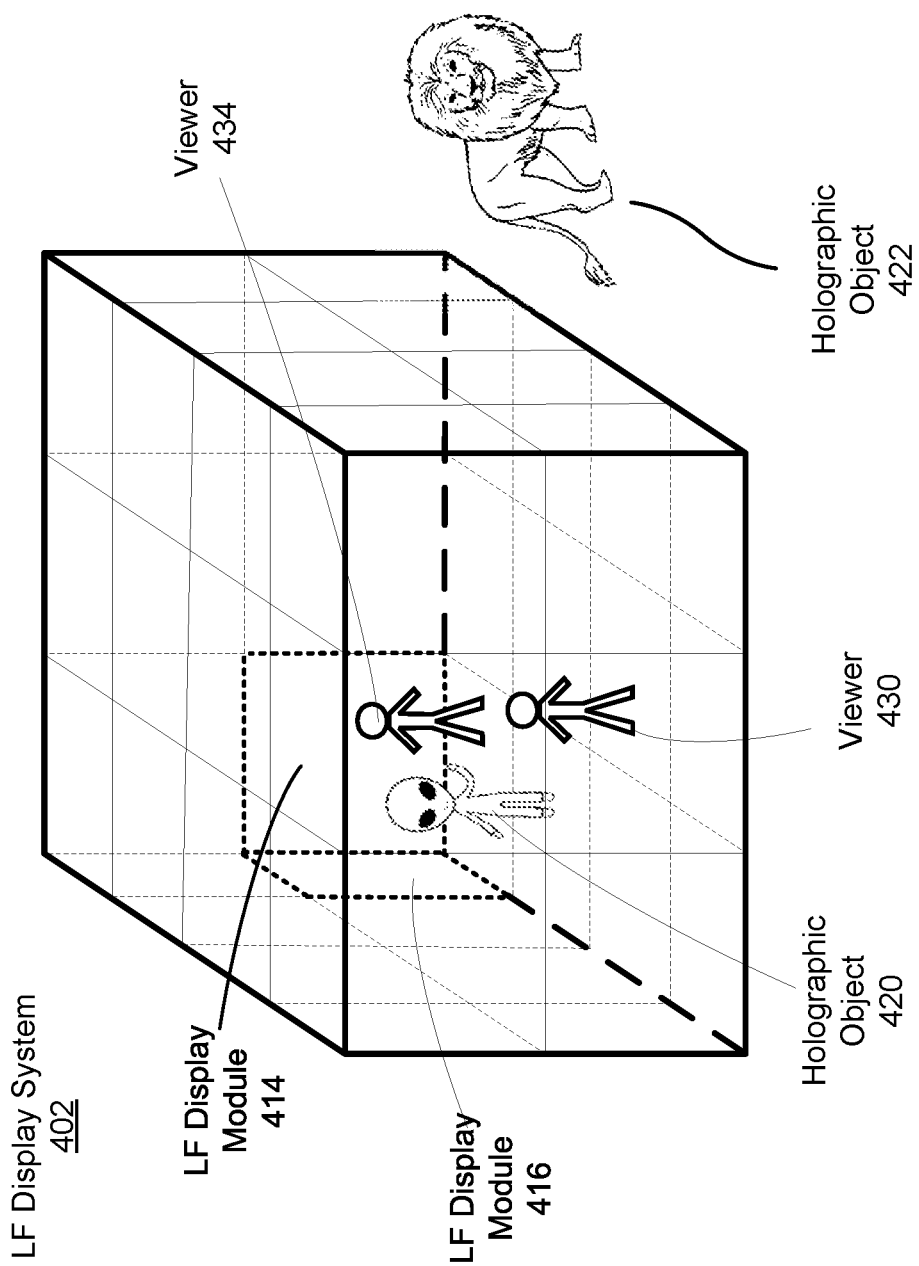
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. Each of the one or more LF display modules has a display surface from where holographic objects are projected. The LF display system 402 is substantially similar to the LF display system 400 except that a seamless display surface is formed by tiling the display surfaces of the one or more LF display modules on multiple walls, the floor, and the ceiling to create a multi-sided seamless surface environment. More specifically, the LF display modules are tiled to form an array that is a six-sided aggregated seamless surface environment. In some embodiments, the seamless display surface may be larger than a surface area of the display surface of a single LF display module. In FIG. 4B, the plurality of LF display modules cover all the walls, the ceiling, and the floor of a room. In other embodiments, the plurality of LF display modules may cover some, but not all of a wall, a floor, a ceiling, or some combination thereof. In other embodiments, a plurality of LF display modules are tiled to form some other aggregated seamless surface. For example, the walls may be curved such that a cylindrical aggregated energy environment is formed.

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 434 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420 and be observed by viewer 430. In this manner, occlusion by viewers in the space can cause some portion of the holographic projections to disappear, but the effect is much less than if only one side of the volume was populated with holographic display panels. Holographic object 422 is illustrated "outside" the walls of the six-sided aggregated seamless surface environment because the holographic object volume extends behind the aggregated surface. Thus, the viewer 430 and/or the viewer 434 can perceive the holographic object 422 as "outside" of the enclosed six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface that approximates the walls of a room. In some other examples, an aggregate surface may only occur on a portion of a surface (e.g., half of a wall) rather than a whole surface (e.g., an entire wall). Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
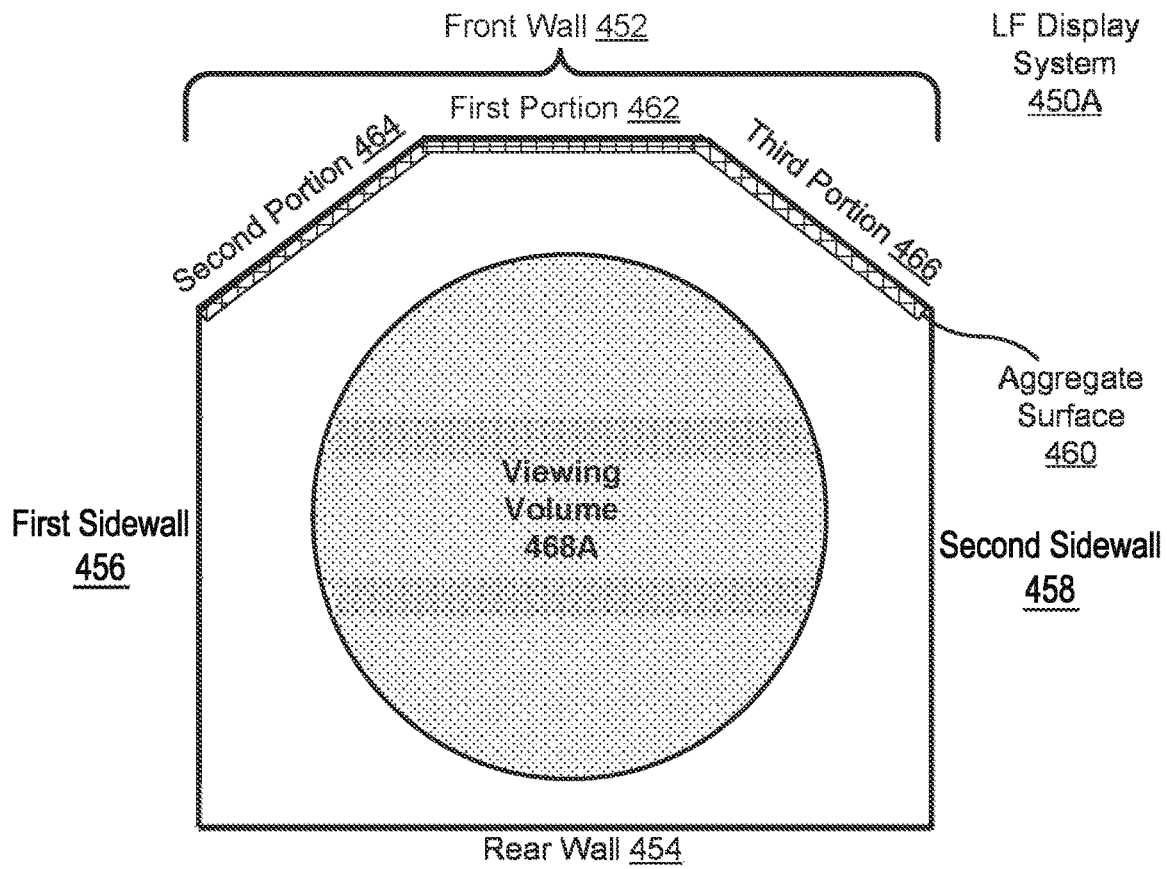
FIG. 4C is a top-down view of a light field display system with an aggregate surface in a winged configuration, in accordance with one or more embodiments.
Figure 4D:
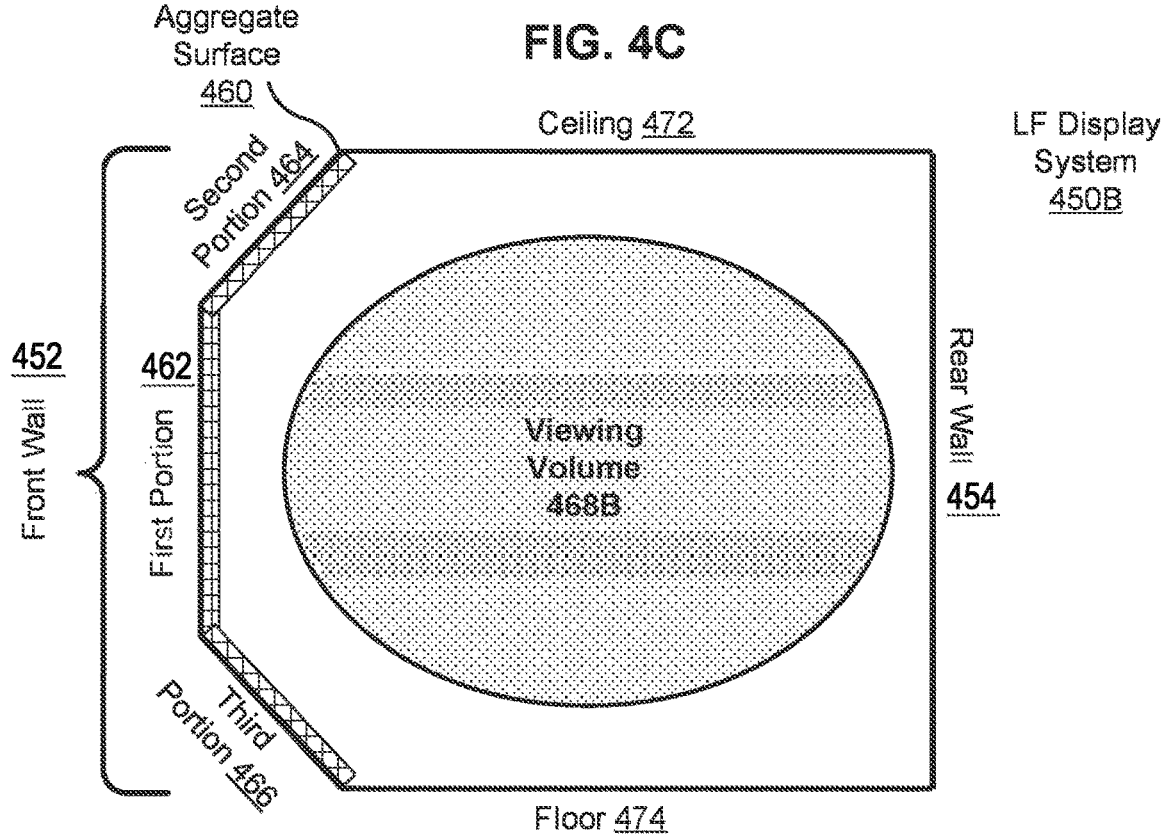
FIG. 4D is a side view of a light field display system with an aggregate surface in a sloped configuration, in accordance with one or more embodiments.

For example, FIG. 4C illustrates top down view of a LF display system 450A with an aggregate surface in a "winged" configuration. In this example, the LF display system 450A is located in a room with a front wall 452, a rear wall 454, a first sidewall 456, a second sidewall 458, a ceiling (not shown), and a floor (not shown). The first sidewall 456, the second sidewall 458, the rear wall 454, floor, and the ceiling are all orthogonal. The LF display system 450A includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the first sidewall 456 and placed at an angle to project energy towards the center of the room (i.e., a first side surface), and (iii) a third portion 466 connecting the first portion 462 to the second sidewall 458 and placed at an angle to project energy towards the center of the room (i.e., a second side surface). The first portion is a vertical plane in the room and has a horizontal and a vertical axis. The second and third portions are angled towards the center of the room along the horizontal axis.

In this example, the viewing volume 468A of the LF display system 450A is in the center of the room and partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Returning to FIG. 4D, in a similar example, FIG. 4D illustrates a side view of a LF display system 450B with an aggregate surface in a "sloped" configuration. In this example, the LF display system 450B is located in a room with a front wall 452, a rear wall 454, a first sidewall (not shown), a second sidewall (not shown), a ceiling 472, and a floor 474. The first sidewall, the second sidewall, the rear wall 454, floor 474, and the ceiling 472 are all orthogonal. The LF display system 450B includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the ceiling 472 and angled to project energy towards the center of the room (i.e., a first side surface), and (iii) a third portion 464 connecting the first portion 462 to the floor 474 and angled to project energy towards the center of the room (i.e., a second side surface). The first portion is a vertical plane in the room and has a horizontal and a vertical axis. The second and third portions are angled towards the center of the room along the vertical axis.

In this example, the viewing volume 468B of the LF display system 450B is in the center of the room and partially surrounded by the three portions of the aggregate surface 460.

Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front wall were used.

Additionally, the configuration of the LF display system and the environment which it is located may inform the shape and locations of the viewing volumes and viewing sub-volumes.

Figure 4E:
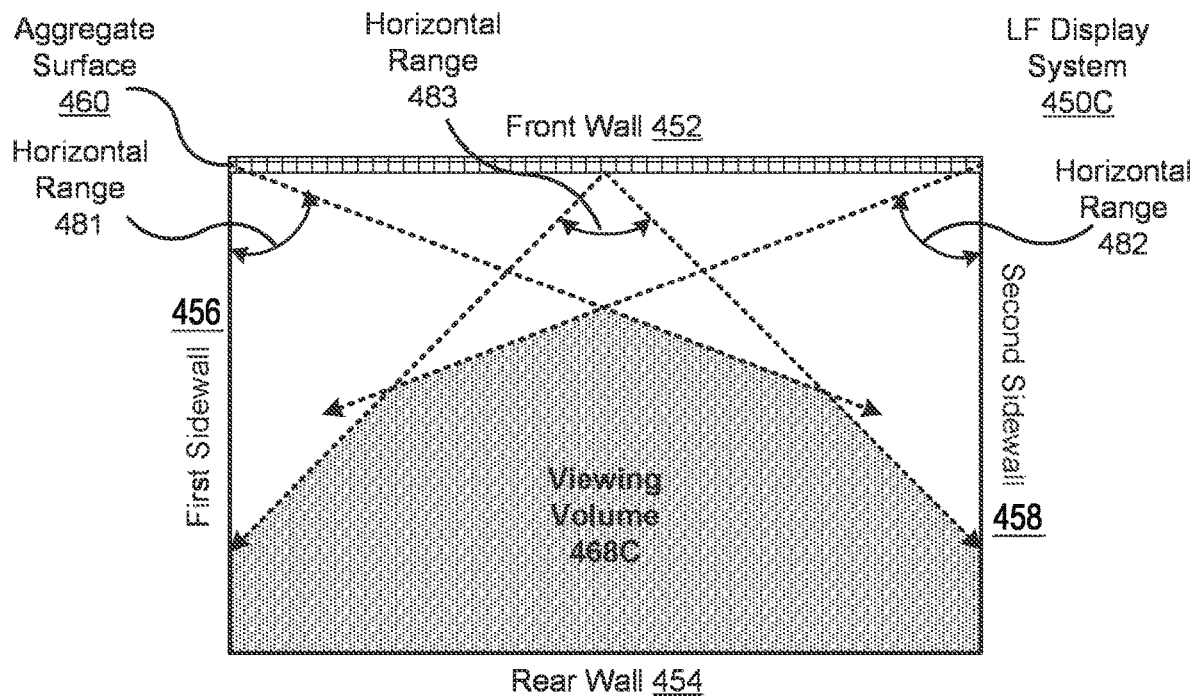
FIG. 4E is a top-down view of a light field display system with an aggregate surface on a front wall of a room, in accordance with one or more embodiments.

FIG. 4E, for example, illustrates a top down view of a LF display system 450C with an aggregate surface 460 on a front wall 452 of a room. In this example, the LF display system 450C is located in a room with a front wall 452, a rear wall 454, a first sidewall 456, a second sidewall 458, a ceiling (not shown), and a floor (not shown).

LF display system 450C projects various rays from the aggregate surface 460. From each position on the display surface, light rays are projected in an angular range that is centered on the viewing volume. The rays projected from the left side of the aggregate surface 460 have horizontal angular range 481, rays projected from the right side of the aggregate surface have horizontal angular range 482, and rays projected from the center of the aggregate surface 460 have horizontal angular range 483. Having a gradient deflection angle in the projected rays across the display surface in this manner creates a viewing volume 468C. Further, this configuration avoids wasting resolution of the display on projecting rays into the side walls 456 and 458.

Figure 4F:
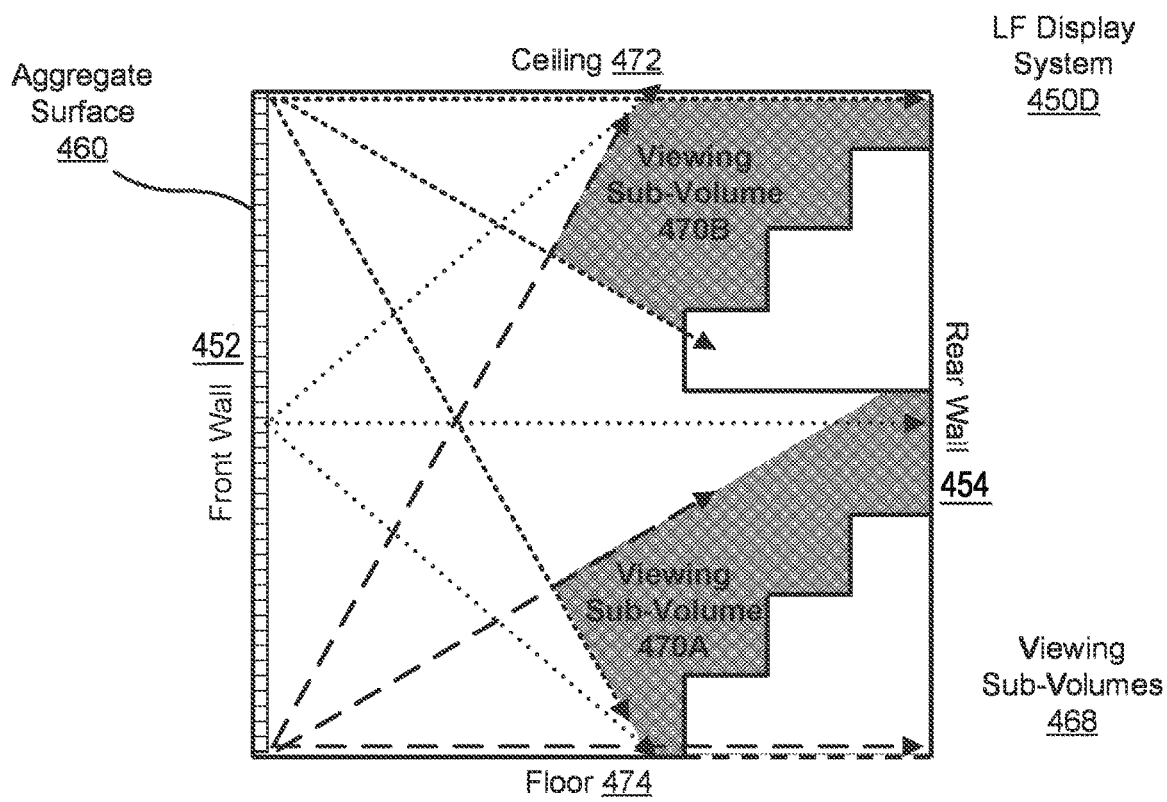
FIG. 4F is a side view of a light field display system with an aggregate surface on the front wall of the room, in accordance with one or more embodiments.

FIG. 4F illustrates a side view of a LF display system 450D with an aggregate surface 460 on a front wall 452 of a room. In this example, the LF display system 450D is located in a room with a front wall 452, a rear wall 454, a first sidewall (not shown), a second sidewall (not shown), a ceiling 472, and a floor 474. In this example, the floor is tiered such that each tier rises in steps moving from the front wall to the back wall. Here, each tier of the floor includes a viewing sub-volume (e.g., viewing sub volume 470A and 470B). A tiered floor allows for viewing sub-volumes that do not overlap. That is, each viewing sub-volume has a line of sight from the viewing sub-volume to the aggregate surface 460 that does not pass through another viewing sub-volume. In other words, this orientation produces a "stadium seating" effect in which the vertical offset between tiers allows each tier to "see over" the viewing sub-volumes of other tiers. LF display systems including viewing sub-volumes that do not overlap may provide a higher quality viewing experience than LF display systems that have viewing volumes that do overlap. For example, in the configuration shown in FIG. 4F, different holographic content may be projected to the audiences in viewing sub-volumes 470A and 470B.

Control of a LF Display System

Figure 5A:
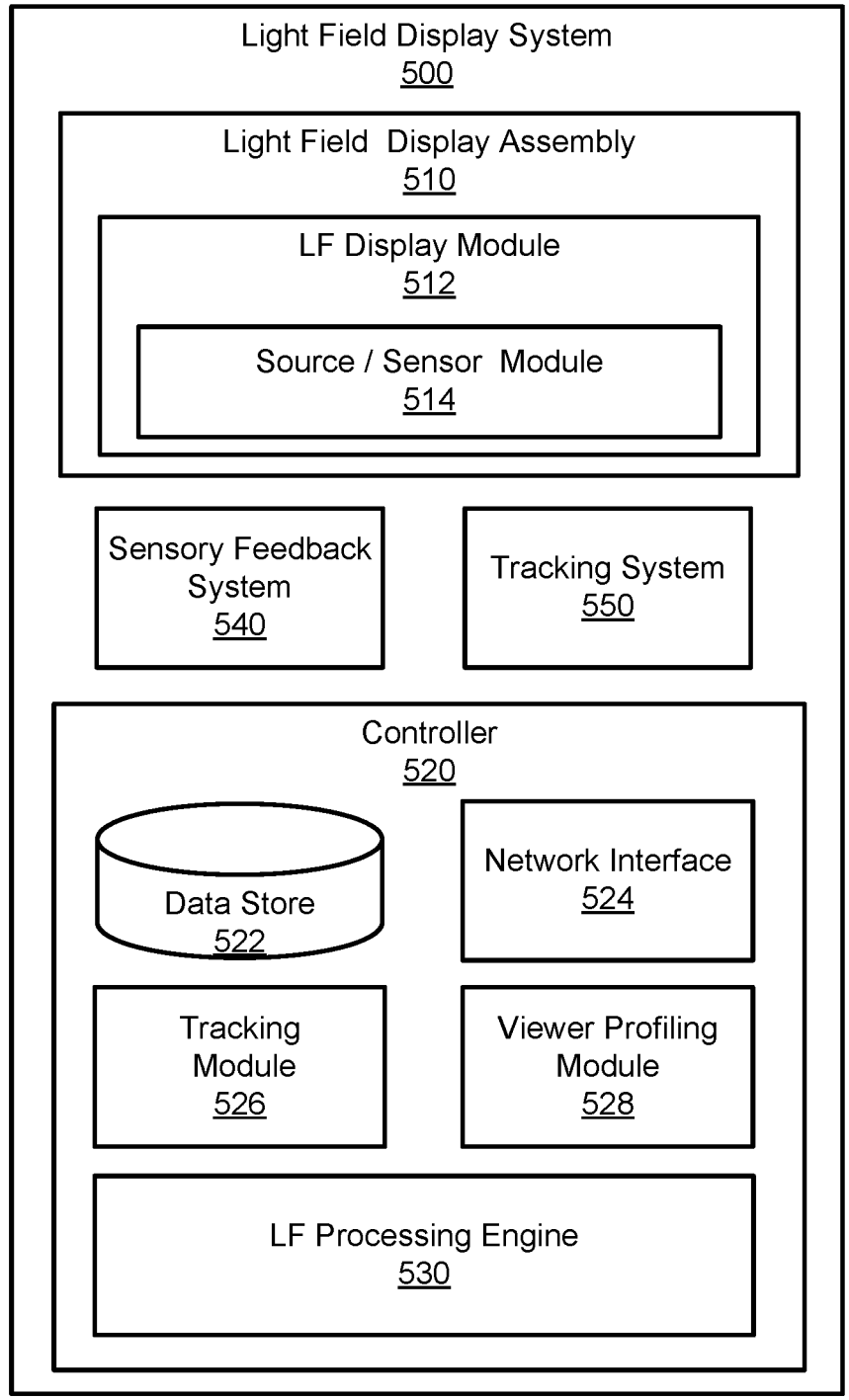
FIG. 5A is a block diagram of a light field display system, in accordance with one or more embodiments.

FIG. 5A is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a data store 522, a network interface 524, and a LF processing engine 530. The controller 520 may also include a tracking module 526, and a viewer profiling module 528. In some embodiments, the LF display system 500 also includes a sensory feedback system 540 and a tracking system 550. The LF display systems described in the context of FIGS. 1, 2A-2B, 3A-3B, and 4A-4F are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-7.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display module 210, LF display module 300A, and LF display module 300B) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a billboard, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

In some embodiments, the LF display system 500 provides holographic content based on a hardware configuration. A hardware configuration is a configuration of the physical components of the LF display system 500 that affects the presentation of holographic content. The physical components may include the LF display modules 512, the sensory feedback devices (e.g., the acoustic projecting devices, the force actuation devices, the pressure sensors, etc.), and the tracking system devices (e.g., the energy sensors, the cameras, the depth sensors, etc.). In one embodiment, the hardware configurations may include an arrangement of the LF display modules, the sensory feedback devices, and the tracking system devices for the LF display system 500. In other embodiments, the hardware configurations may include the design of the LF display modules. The design considerations for the LF display modules may include the resolution (i.e., the level of detail of the presented holographic content), the number of projected rays per degree (i.e., the density of light rays which determines angular resolution and projection distance), the field of view (i.e., the open observable area of the viewing volume), the deflection angle on the display surface (i.e., the angle the projected rays make with the normal to the display surface), the dimensionality of the display surface (i.e., the height and width of the display panels), any other LF display module design consideration that affect the presentation of holographic content, or some combination thereof.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF display assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, or smell) using a sensory feedback system 540. The sensory feedback system 540 may augment the projection of holographic content by executing display instructions received from the controller 520. The sensory feedback system 540 may comprise one or more sensory feedback devices and may be configured to provide sensory feedback simultaneously with the holographic object. Generally, the sensory feedback system 540 includes any number of sensory feedback devices external to the LF display assembly 510 (e.g., the sensory feedback system 442). Some example sensory feedback devices may include coordinated acoustic projecting and receiving devices, tactile feedback, aroma feedback, temperature feedback, force actuation devices, pressure sensors, transducers, etc. In some cases, the sensory feedback system 540 may have similar functionality to the LF display assembly 510 and vice versa. For example, both a sensory feedback system 540 and a LF display assembly 510 may be configured to generate a sound field. As another example, the sensory feedback system 540 may be configured to generate haptic surfaces while the LF display assembly 510 is not.

To illustrate, in an example embodiment of a LF display system 500, a sensory feedback system 540 may include one or more acoustic projection devices. The one or more acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 540 may include an aroma projecting device. The aroma projecting device may be configured to provide scents to some, or all, of the target area when executing display instructions received from the controller. The aroma devices may be tied into an air circulation system (e.g., ducting, fans, or vents) to coordinate air flow within the target area. Further, the sensory feedback system 540 may include a temperature adjustment device. The temperature adjustment device is configured to increase or decrease temperature in some, or all, of the target area when executing display instructions received from the controller 520.

In some embodiments, the sensory feedback system 540 is configured to receive input from viewers of the LF display system 500. In this case, the sensory feedback system 540 includes various sensory feedback devices for receiving input from viewers. The sensor feedback devices may include devices such as acoustic receiving devices (e.g., a microphone), pressure sensors, joysticks, motion detectors, transducers, etc. The sensory feedback system may transmit the detected input to the controller 520 to coordinate generating holographic content and/or sensory feedback.

To illustrate, in an example embodiment of a LF display assembly, a sensory feedback system 540 includes a microphone. The microphone is configured to record audio produced by one or more viewers (e.g., voice commands, audio responses to presentation of holographic content, etc.). The sensory feedback system 540 provides the recorded audio to the controller 520 as viewer input. The controller 520 may use the viewer input to generate holographic content. Similarly, the sensory feedback system 540 may include a pressure sensor. The pressure sensor is configured to measure forces applied by viewers to the pressure sensor. The sensory feedback system 540 may provide the measured forces to the controller 520 as viewer input.

In some embodiments, the LF display system 500 includes a tracking system 550. The tracking system 550 includes any number of tracking devices configured to track movement of the viewer within the viewing volume of the LF display system 500, monitor responses of the viewer to the holographic content, and determine characteristics of the viewer within the viewing volume of the LF display system 500. Generally, the tracking devices are external to the LF display assembly 510. Some example tracking devices include a camera assembly ("camera"), a depth sensor, structured light, a LIDAR system, a card scanning system, or any other tracking device that can track viewers within a target area.

The tracking system 550 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 550 may adjust one or more emission parameters when executing instructions received from the controller 520. An emission parameter is a parameter that affects how light is projected from a source of the tracking system 550. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The tracking system 550 may comprise one or more cameras configured to capture images of an area in front of the one or more LF display modules 512. The camera of the tracking system 550 captures images of the light (e.g., structured light pattern) reflected from the target area. The camera captures images when executing tracking instructions received from the controller 520. As previously described, the light may be projected by a source of the tracking system 550. The camera may include one or more cameras. That is, a camera may be, e.g., an array (1-D or 2-D) of photodiodes, a CCD sensor, a CMOS sensor, some other device that detects some or all of the light project by the tracking system 550, or some combination thereof. In an embodiment, the tracking system 550 may contain one or more cameras that are external to the LF display assembly 510. In other embodiments, the cameras are included as part of the LF display source/sensor module 514 included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 550 may adjust one or more imaging parameters when executing tracking instructions received from the controller 520. An imaging parameter is a parameter that affects how the camera captures images. An imaging parameter may include, e.g., frame rate, aperture, gain, exposure length, frame timing, rolling shutter or global shutter capture modes, some other parameter that affects how the camera captures images, or some combination thereof.

The tracking system 550 may comprise one or more depth sensors configured to detect the depth of objects in front of the one or more LF display modules 512. The depth sensors may track positions of viewers within the viewing volume.

The controller 520 controls the LF display assembly 510 and any other components of the LF display system 500. The controller 520 comprises a data store 522, a network interface 524, a tracking module 526, a viewer profiling module 528, and a LF processing engine 530. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 550.

The data store 522 is a memory that stores information for the LF display system 500. The stored information may include display instructions, tracking instructions, emission parameters, imaging parameters, a virtual model of a target area, tracking information, images captured by the camera, one or more viewer profiles, calibration data for the LF display assembly 510, configuration data for the LF display system 510 including resolution and orientation of LF modules 512, desired viewing volume geometry, content for graphics creation including 3-D models, scenes and environments, materials and textures, other information that may be used by the LF display system 500, or some combination thereof. The data store 522 is a memory, such as a read only memory (ROM), dynamic random access memory (DRAM), static random access memory (SRAM), or some combination thereof.

The network interface 524 allows the LF display system to communicate with other systems or environments via a network. In one example, the LF display system 500 receives holographic content from a remote LF display system via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 550, and provides the tracking instructions to the tracking system 550. The tracking system 550 executes the tracking instructions and provides tracking input to the tracking module 526.

The tracking module 526 may determine a position of one or more viewers within the target area. The determined position may be relative to, e.g., some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 550. The cameras of the tracking system 550 may be distributed about the LF display system 500, and can capture images in stereo, allowing for the tracking module 526 to passively track viewers. In other embodiments, the tracking module 526 actively tracks viewers. That is, the tracking system 550 illuminates some portion of the target area, images the target area (i.e., captures the light field from an area in front of the one or more LF display modules 512), and the tracking module 526 uses time-of-flight and/or structured light depth determination techniques to determine position. The tracking module 526 generates tracking information using the determined positions.

The tracking module 526 may also receive tracking information as inputs from viewers of the LF display system 500. In one embodiment, the LF display assembly 510 may receive input based on the captured light field from the area in front of the one or more LF display modules 512. The tracking information may include body movements that correspond to various input options that the viewer is provided by the LF display system 500. For example, the tracking module 526 may track a viewer's body movement and assign any various movement as an input to the LF processing engine 530. The tracking module 526 may provide the tracking information to the data store 522, the network interface 524, the LF processing engine 530, the viewer profiling module 528, any other component of the LF display system 500, or some combination thereof.

To provide context for the tracking module 526, consider an example embodiment of an LF display system 500 that displays a holographic merchandise to a viewer. In response to displaying certain holographic merchandise, the viewer may respond with hand and/or arm movements which may be assigned to various inputs. The tracking system 550 may record the movement of the viewer's hands and/or arms and transmit the recording to the tracking module 526. The tracking module 526 tracks the motion of the viewer's hands and/or arms in the recording and sends the input to LF processing engine 530. The viewer profiling module 528, as described below, determines that information in the image indicates that motion of the viewer's hands is associated with, e.g., an input to purchase the merchandise. Accordingly, the LF processing engine 530 generates appropriate holographic content to confirm purchase of the merchandise.

The LF display system 500 includes a viewer profiling module 528 configured to identify and profile viewers. The viewer profiling module 528 generates a profile of a viewer (or viewers) that views holographic content displayed by a LF display system 500. The viewer profiling module 528 generates a viewer profile based, in part, on viewer input, characteristics of the viewer, and monitored viewer behavior, actions, and reactions. The viewer profiling module 528 can access information obtained from tracking system 550 (e.g., recorded images, videos, sound, etc.) and process that information to determine various information. In various examples, viewer profiling module 528 can use any number of machine vision or machine hearing algorithms to determine viewer behavior, actions, and reactions. Monitored viewer behavior can include, for example, smiles, frowns, cheering, clapping, laughing, excitement levels, other changes in facial expressions, gestures, or movement by the viewers, etc.

More generally, a viewer profile may include any information received and/or determined about a viewer viewing holographic content from the LF display system. For example, each viewer profile may log actions or responses of that viewer to the content displayed by the LF display system 500. Some example information that can be included in a viewer profile are provided below.

In some embodiments, a viewer profile may describe a response of a viewer with respect to a displayed holographic merchandise, displayed holographic content object, etc. For example, a viewer profile may indicate that a viewer generally has positive response to clothing items (displayed holographically) that have floral print.

In some embodiments, a viewer profile can indicate characteristics of a viewer viewing information on news, e.g., a news broadcast with the LF display system 500, e.g., in a doctor's waiting room. The LF display system 500 is further configured to update presentation of the holographic content in response to the characteristics of a viewer profile corresponding to the viewer. In this same example, a viewer in in the waiting room is wearing a sweatshirt displaying a university logo. In this case, the viewer profile can indicate that the viewer is wearing a sweatshirt and may prefer holographic content associated with the university whose logo is on the sweatshirt, e.g., holographic content related to upcoming events on that university's campus, a weather forecast for that university's geographic location, recent sports scores for that university's sports teams, etc. More broadly, viewer characteristics that can be indicated in a viewer profile may include, for example, age, sex, ethnicity, clothing, viewing location, etc.

In some embodiments, a viewer profile can indicate preferences for a viewer in regard to desirable holographic content. For example, a viewer profile may indicate that a viewer prefers only to view holographic content that is age appropriate for everyone in their family. In another example, a viewer profile may indicate holographic object volumes to display holographic content (e.g., on a wall) and holographic object volumes to not display holographic content (e.g., above their head). The viewer profile may also indicate that the viewer prefers to have haptic interfaces presented near them, or prefers to avoid them.

In another example, a viewer profile indicates a history of holographic merchandise viewed for a particular viewer. For instance, viewer profiling module 528 determines that a viewer has previously viewed a desk, holographically displayed. As such the LF display system 500 may display another similar desk that the viewer may also appreciate or an office chair that may suit the previously viewed desk.

In some embodiments, a viewer profile may also describe characteristics and preferences for a group of viewers rather than a particular viewer. For example, viewer profiling module 528 may generate a viewer profile for a family with a LF display system 500 implemented in the home. In one example, viewer profiling module 528 creates a viewer profile for the family with characteristics describing the family's collective interests. The profile may further break down percentages of the family members that may have various interests.

The viewer profiling module 528 may also access a profile associated with a particular viewer (or viewers) from a third-party system or systems to build a viewer profile. For example, a viewer purchases a merchandise item from a third-party vendor that is linked to that viewer's social media account. Thus, the viewer's purchase is linked to his social media account. When the viewer enters a retail store implementing a LF display system 500, the viewer profiling module 528 can access information from his social media account to build (or augment) a viewer profile.

In some embodiments, the data store 522 includes a viewer profile store that stores viewer profiles generated, updated, and/or maintained by the viewer profiling module 528. The viewer profile can be updated in the data store at any time by the viewer profiling module 528. For example, in an embodiment, the viewer profile store receives and stores information regarding a particular viewer in their viewer profile when the particular viewer views holographic content provided by the LF display system 500. In this example, the viewer profiling module 528 includes a facial recognition algorithm that may recognize viewers and positively identify them as they view presented holographic content. To illustrate, as a viewer enters the target area of the LF display system 500, the tracking system 550 obtains an image of the viewer. The viewer profiling module 528 inputs the captured image and identifies the viewer's face using the facial recognition algorithm. The identified face is associated with a viewer profile in the profile store and, as such, all input information obtained about that viewer may be stored in their profile. The viewer profiling module may also utilize card identification scanners, voice identifiers, a radio-frequency identification (RFID) chip scanners, barcode scanners, etc. to positively identify a viewer.

In embodiments where the viewer profiling module 528 can positively identify viewers, the viewer profiling module 528 can determine each visit of each viewer to the LF display system 500. The viewer profiling module 528 may then store the time and date of each visit in the viewer profile for each viewer. Similarly, the viewer profiling module 528 may store received inputs from a viewer from any combination of the sensory feedback system 540, the tracking system 550, and/or the LF display assembly 510 each time they occur. The viewer profiling module 528 may additionally receive further information about a viewer from other modules or components of the controller 520 which can then be stored with the viewer profile. Other components of the controller 520 may then also access the stored viewer profiles for determining subsequent content to be provided to that viewer.

The LF processing engine 530 generates holographic content comprised of light field data, as well as data for all of the sensory domains supported by a LF display system 500. For example, LF processing engine 530 may generate 4-D coordinates in a rasterized format ("rasterized data") that, when executed by the LF display assembly 510, cause the LF display assembly 510 to present holographic content. The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4-D coordinates and sensory data represent holographic content as display instructions executable by a LF display system to generate holographic and sensory content. More generally, holographic content can take the form of CG content with ideal light field coordinates, live action content, rasterized data, vectorized data, electromagnetic energy transported by a set of relays, instructions sent to a group of energy devices, energy locations on one or more energy surfaces, the set of energy propagation paths that are projected from the display surface, a holographic object that is visible to a viewer or an audience, and many other similar forms.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short film for holographic projection by a LF display system 500. In this example, the LF display system 500 includes a display containing several gigapixels and the rasterized data contains information for each pixel location on the display. The corresponding size of the rasterized data is vast (e.g., many gigabytes per second of film display time), and unmanageable for efficient transfer over commercial networks via a network interface 524. The efficient transfer problem may be amplified for applications including live streaming of holographic content. An additional problem with merely storing rasterized data on data store 522 arises when an interactive experience is desired using inputs from the sensory feedback system 540 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In some embodiments, the LF display system 500 may be configured to receive holographic content in an encoded format via a network and may further be configured to decode the holographic content into a format for presentation to the viewer. In some embodiments, the encoded format may be a vectorized format and the decoded format may be a rasterized format. In summary, the LF processing engine 530 may generate holographic content derived from rasterized data accessed from the data store 522, vectorized data accessed from the data store 522, or vectorized data received via the network interface 524. In various configurations, vectorized data may be encoded before data transmission and decoded after reception by the LF controller 520. In some examples, the vectorized data is encoded for added data security and performance improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors.

Vectorized data contains all the information for each of the sensory domains supported by a LF display system 500 in way that may support an interactive experience. For example, vectorized data for an interactive holographic experience may include any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data using the LF display assembly 510. In various configurations, the vectorized properties may include one or more red/green/blue/alpha channel (RGBA)+depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 may also generate an interactive viewing experience. That is, holographic content may be responsive to input stimuli containing information about viewer locations, gestures, interactions, interactions with holographic content, or other information derived from the viewer profiling module 528 and/or tracking module 526. For example, in an embodiment, a LF processing engine 530 creates an interactive viewing experience using vectorized data of a real-time performance received via a network interface 524. In another example, if a holographic object needs to move in a certain direction immediately in response to a viewer interaction, the LF processing engine 530 may update the render of the scene so the holographic object moves in that required direction. This may require the LF processing engine 530 to use a vectorized data set to render light fields in real time based on a 3-D graphical scene with the proper object placement and movement, collision detection, occlusion, color, shading, lighting, etc., correctly responding to the viewer interaction. The LF processing engine 530 converts the vectorized data into rasterized data for presentation by the LF display assembly 510.

The rasterized data includes holographic content instructions and sensory instructions (display instructions) representing the real-time performance. The LF display assembly 510 simultaneously projects holographic and sensory content of the real-time performance by executing the display instructions. The LF display system 500 monitors viewer interactions (e.g., vocal response, touching, etc.) with the presented real-time performance with the tracking module 526 and viewer profiling module 528. In response to the viewer interactions, the LF processing engine may create an interactive experience by generating additional holographic and/or sensory content for display to the viewers.

To illustrate, consider an example embodiment of an LF display system 500 including a LF processing engine 530 that generates a holographic object representing a bicycle to a viewer. The viewer may move to touch the holographic object representing the bicycle. Correspondingly, the tracking system 550 tracks movement of the viewer's hands relative to the holographic object. The movement of the viewer is recorded by the tracking system 550 and sent to the controller 520. The tracking module 526 continuously determines the motion of the viewer's hand and sends the determined motions to the LF processing engine 530. The LF processing engine 530 determines the placement of the viewer's hand, adjusts the real-time rendering of the graphics to include any required change in the holographic object (such as position, color, or occlusion). The LF processing engine 530 instructs the LF display assembly 510 (and/or sensory feedback system 540) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the viewer is given both a visual and tactile perception of touching the bicycle. More simply, when a viewer views his hand touching a holographic bicycle, the viewer simultaneously feels haptic feedback indicating their hand touches the holographic bicycle, and the bicycle changes position or motion in response to the touch. In some examples, rather than presenting an interactive bicycle accessed from a data store 522, the interactive bicycle may be received as part of holographic content received as part of holographic content received from a live-streaming application via a network interface 524.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 can use information from the tracking system 550, the sensory feedback system 540, the viewer profiling module 528, the tracking module 526, or some combination thereof, to create holographic content for display. In some examples, LF processing engine 530 may access information from elements of the LF display system 500 (e.g., tracking information and/or a viewer profile), create holographic content based on that information, and display the created holographic content using the LF display system 500 in response. The created holographic content may be augmented with other sensory content (e.g., touch, audio, or smell) when displayed by the LF display system 500. Further, the LF display system 500 may store created holographic content such that it may be displayed in the future.

Dynamic Content Generation for a LF Display System

In some embodiments, the LF processing engine 530 incorporates an artificial intelligence (AI) model to create holographic content for display by the LF display system 500. The AI model may include supervised or unsupervised learning algorithms including but not limited to regression models, neural networks, classifiers, or any other AI algorithm. The AI model may be used to determine viewer preferences based on viewer information recorded by the LF display system 500 (e.g., by tracking system 550) which may include information on a viewer's behavior.

The AI model may access information from the data store 522 to create holographic content. For example, the AI model may access viewer information from a viewer profile or profiles in the data store 522 or may receive viewer information from the various components of the LF display system 500. To illustrate, the AI model may determine a viewer may appreciate viewing another holographic merchandise when considering viewing history of various other holographic merchandise. The AI model may also store the learned preferences of each viewer in the viewer profile store of the data store 522. In some examples, the AI model may create holographic content for an individual viewer rather than a group of viewers.

One example of an AI model that can be used to identify characteristics of viewers, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. For example, and AI model may include five layers of nodes: layers A, B, C, D, and E. The transformation from layer A to layer B is given by a function $W_1$, the transformation from layer B to layer C is given by $W_2$, the transformation from layer C to layer D is given by $W_3$, and the transformation from layer D to layer E is given by $W_4$. In some examples, the transformation can also be determined through a set of weights and parameters used to transform between previous layers in the model. For example, the transformation $W_4$ from layer D to layer E can be based on parameters used to accomplish the transformation $W_1$ from layer A to B.

The input to the model can be an image taken by tracking system 550 encoded onto the convolutional layer A and the output of the model is holographic content decoded from the output layer E. Alternatively or additionally, the output may be a determined characteristic of a viewer in the image. In this example, the AI model identifies latent information in the image representing viewer characteristics in the identification layer C. The AI model reduces the dimensionality of the convolutional layer A to that of the identification layer C to identify any characteristics, actions, responses, etc. in the image. In some examples, the AI model then increases the dimensionality of the identification layer C to generate holographic content.

The image from the tracking system 550 is encoded to a convolutional layer A. Images input in the convolutional layer A can be related to various characteristics and/or reaction information, etc. in the identification layer C. Relevance information between these elements can be retrieved by applying a set of transformations between the corresponding layers. That is, a convolutional layer A of an AI model represents an encoded image, and identification layer C of the model represents a smiling viewer. Smiling viewers in a given image may be identified by applying the transformations $W_1$ and $W_2$ to the pixel values of the image in the space of convolutional layer A. The weights and parameters for the transformations may indicate relationships between information contained in the image and the identification of a smiling viewer. For example, the weights and parameters can be a quantization of shapes, colors, sizes, etc. included in information representing a smiling viewer in an image. The weights and parameters may be based on historical data (e.g., previously tracked viewers).

Smiling viewers in the image are identified in the identification layer C. The identification layer C represents identified smiling viewers based on the latent information about smiling viewers in the image.

Identified smiling viewers in an image can be used to generate holographic content. To generate holographic content, the AI model starts at the identification layer C and applies the transformations $W_2$ and $W_3$ to the value of the given identified smiling viewers in the identification layer C. The transformations result in a set of nodes in the output layer E. The weights and parameters for the transformations may indicate relationships between identified smiling viewers and specific holographic content and/or preferences. In some cases, the holographic content is directly output from the nodes of the output layer E, while in other cases the content generation system decodes the nodes of the output layer E into a holographic content. For example, if the output is a set of identified characteristics, the LF processing engine 530 can use the characteristics to generate holographic content.

Additionally, the AI model can include layers known as intermediate layers. Intermediate layers are those that do not correspond to an image, identifying characteristics/reactions, etc., or generating holographic content. For example, in the given example, layer B is an intermediate layer between the convolutional layer A and the identification layer C. Layer D is an intermediate layer between the identification layer C and the output layer E. Hidden layers are latent representations of different aspects of identification that are not observed in the data, but may govern the relationships between the elements of an image when identifying characteristics and generating holographic content.

For example, a node in the hidden layer may have strong connections (e.g., large weight values) to input values and identification values that share the commonality of "laughing people smile." As another example, another node in the hidden layer may have strong connections to input values and identification values that share the commonality of "scared people scream." Of course, any number of linkages are present in a neural network. Additionally, each intermediate layer is a combination of functions such as, for example, residual blocks, convolutional layers, pooling operations, skip connections, concatenations, etc. Any number of intermediate layers B can function to reduce the convolutional layer to the identification layer and any number of intermediate layers D can function to increase the identification layer to the output layer.

In one embodiment, the AI model includes deterministic methods that have been trained with reinforcement learning (thereby creating a reinforcement learning model). The model is trained to increase the quality of the performance using measurements from tracking system 550 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told which actions to take (e.g., generating prescribed holographic content), but instead discovers which actions yield the most reward (e.g., increasing the quality of holographic content by making more people cheer) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of generating an advertisement for a jean brand, the reinforcement learning system captures information about viewers in the venue (e.g., age, disposition, etc.). Such an agent senses the state of the environment and takes actions that affect the state to achieve a goal or goals (e.g., creating content that leads to the most impressions, creating content that leads to the most conversions). In its most basic form, the formulation of reinforcement learning includes three aspects for the learner: sensation, action, and goal.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the LF processing engine creates holographic content that the LF processing engine knows will result in a viewer laughing after a long period of time, the LF processing engine may change the holographic content such that the time until a viewer laughs decreases.

Further, reinforcement learning considers the whole problem of a goal-directed agent interacting with an uncertain environment. Reinforcement learning agents have explicit goals, can sense aspects of their environments, and can choose actions to receive high rewards (i.e., high conversion rate). Moreover, agents generally operate despite significant uncertainty about the environment they face. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed and actions are carried out to achieve a goal. The learner and decision-maker is called the agent (e.g., LF processing engine 530). The thing it interacts with, comprising everything outside the agent, is called the environment (e.g., viewers in a venue, viewers at a shopping mall, viewers on a subway train etc.). These two interact continually, the agent selecting actions (e.g., creating holographic content) and the environment responding to those actions and presenting new situations to the agent. The environment also gives rise to rewards, special numerical values that the agent tries to maximize over time. In one context, the rewards act to maximize viewer positive reactions to holographic content. A complete specification of an environment defines a task which is one instance of the reinforcement learning problem.

To provide more context, an agent (e.g., LF processing engine 530) and environment interact at each of a sequence of discrete time steps, i.e. t=0, 1, 2, 3, etc. At each time step t the agent receives some representation of the environment's state $s_t$ (e.g., measurements from tracking system 550). The states $s_t$ are within S, where S is the set of possible states. Based on the state $s_t$ and the time step t, the agent selects an action at (e.g., offering a sale on the jean brand). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted 74 where $\pi_t(s,a)$ is the probability that $a_t=a$ if $s_t=s$. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. generating holographic content). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Of course, the AI model can include any number of machine learning algorithms. Some other AI models that can be employed are linear and/or logistic regression, classification and regression trees, k-means clustering, vector quantization, etc. Whatever the case, generally, the LF processing engine 530 takes an input from the tracking module 526 and/or viewer profiling module 528 and a machine learning model creates holographic content in response. Similarly, the AI model may direct the rendering of holographic content.

LF processing engine 530 can create holographic content based on a holographic merchandise being displayed. For example, the holographic merchandise being shown may be associated with a set of metadata describing the merchandise's characteristics. The metadata may include, for example, the color, the material, ratings by other purchasers, cost, sales, etc. LF processing engine 530 may access any of the metadata describing the holographic merchandise and generate holographic content to present. For example, a holographic merchandise representing a couch is being presented by a LF display system 500 implemented in a viewer's home. The LF processing engine 530 accesses the metadata of the couch to create holographic content for the walls of the home to complement the couch. Here, the metadata may include the color and the material. The LF processing engine 530 inputs the metadata into an AI model and receives holographic content to display on the walls of the home in response.

In an example, the LF processing engine 530 can convert a traditional two-dimensional (2-D) film to holographic content for display by a LF display system. For example, the LF processing engine 530 can input a traditional film into an AI model and the AI model converts any part of the traditional film into holographic content. In an example, the AI model may convert a traditional film into holographic content by using machine learning algorithms trained by converting two-dimensional data to holographic data. In various circumstances, the training data may be previously generated, created, or some combination of the two. The LF display system 500 may then display the holographic version of the film rather than the traditional two-dimensional version of the film.

Digital Signage Content Distribution System

Figure 5B:
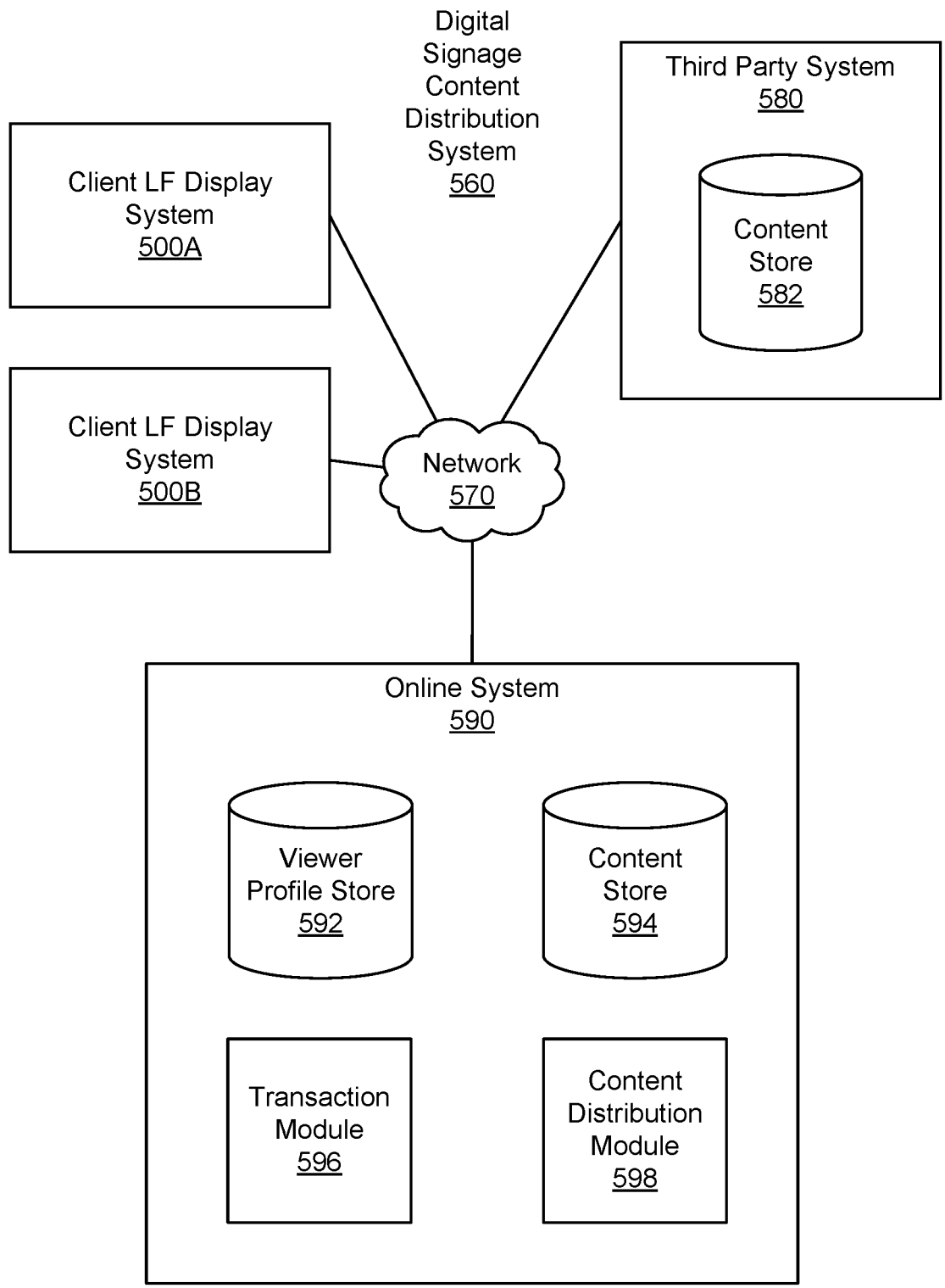
FIG. 5B is a block diagram of a light field signage application environment incorporating a light field display system for signage, in accordance with one or more embodiments.

FIG. 5B is a block diagram of a LF digital signage content distribution system 560 incorporating a LF display system for digital signage, in accordance with one or more embodiments. The LF digital signage content distribution system 560 shown by FIG. 5B comprises one or more client LF display systems 500A & 500B, a network 570, one or more third party systems 580, and the online system 590. In alternative configurations, different and/or additional components may be included in the LF digital signage content distribution system 560. For example, the online system 590 may comprise a social networking system, a content sharing network, or another system providing content to viewers.

The client LF display systems 500A & 500B are capable of displaying holographic content, receiving input, and transmitting and/or receiving data via the network 570. The client LF display system 500A and 500B are embodiments of the LF display system 500. As such, each client LF display system comprises a controller configured to receive holographic content via a network 570 and a LF display assembly (e.g., the LF display assembly 510). The LF display assembly may comprise one or more LF display modules (e.g., the LF display modules 512) that display the holographic content as digital signage in a holographic object volume to a viewer located in a viewing volume. The client LF display systems 500A and 500B are configured to communicate via the network 570. In some embodiments, the client LF display systems 500A and 500B execute an application allowing a viewer of the client LF display system to interact with the online system 590. For example, a client LF display system 500A executes a browser application to enable interaction between the client LF display system 500A and the online system 590 via the network 570. In other embodiments, a client LF display system 500A interacts with the online system 590 through an application programming interface (API) running on a native operating system of the client LF display system 500A, such as IOS® or ANDROID™. As previously discussed, for efficient transfer speeds, data for the client LF display systems 500A and 500B may be transferred over the network 570 as vectorized data. An LF processing engine (e.g., the LF processing engine 530) at each client LF display system may decode the vectorized data and convert it into rasterized format for display on the corresponding LF display assembly (e.g., the LF display assembly 510).

The client LF display systems 500A and 500B are configured to communicate via the network 570, which may comprise any combination of local area and/or wide area networks, using both wired and/or wireless communication systems. In some embodiments, the network 570 uses standard communications technologies and/or protocols. For example, the network 570 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 570 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 570 may be represented using any suitable format, such as hypertext markup language (HTML) or extensible markup language (XML). In some embodiments, all or some of the communication links of the network 570 may be encrypted using any suitable technique or techniques.

One or more third party systems 580 may be coupled to the network 570 for communicating with the online system 590. In some embodiments, a third party system 580 is a signage control system, e.g., a content provider, communicating holographic content to be distributed to the client LF display systems 500A and 500B via the network 570. In some embodiments, the third party system 580 may also communicate holographic content to the online system 590 which may then distribute the holographic content to the client LF display systems 500A and 500B. Each third party system 580 has a content store 582 which may store holographic content items that can be distributed for presentation to the client LF display systems 500A and 500B. The third party system 580 may provide holographic content to the one or more client LF display systems 500A and 500B in exchange for a payment. In one embodiment, holographic content items may be associated with costs that can be collected by the online system 590 when distributed to the client LF display systems 500A and 500B for presentation.

The online system 590 mediates distribution of holographic content by providing holographic content to the client LF display system 500A and 500B in exchange for a payment. The holographic content is provided via the network 570. The online system 590 includes a viewer profile store 592, a content store 594, a transaction module 596, and a content distribution module 598. In other embodiments, the online system 590 may include additional, fewer, or different components for various applications. Conventional components such as network interfaces, security functions, load balancers, failover servers, management and network operations consoles, and the like are not shown so as to not obscure the details of the system architecture.

Each viewer of the online system 590 may be associated with a viewer profile, which is stored in the viewer profile store 592. A viewer profile includes declarative information about the viewer that was explicitly shared by the viewer and may also include profile information inferred by the online system 590. In some embodiments, a viewer profile includes multiple data fields, each describing one or more attributes of the corresponding online system viewer. Examples of information stored in a viewer profile include biographic, demographic, and other types of descriptive information, such as work experience, educational history, gender, hobbies or preferences, location and the like. A viewer profile may also store other information provided by the viewer, for example, images or videos. In certain embodiments, images of viewers may be tagged with information identifying the online system viewers displayed in an image, with information identifying the images in which a viewer is tagged stored in the viewer profile of the viewer. A viewer profile in the viewer profile store 592 may also maintain references to actions by the corresponding viewer performed on content items in the content store 594, including monitored responses of a viewer or characteristics of a viewer captured with a tracking system (e.g., the tracking system 550) and determined by a tracking module (e.g., the tracking module 526). The monitored responses of the viewer may include a position of the viewer in the viewing volume, a movement of the viewer, a gesture of the viewer, a facial expression of the viewer, and a gaze of the viewer. The LF display assembly may update the presentation of the holographic content in response to the monitored responses of the viewer. The characteristics of the viewer may include demographic information of the viewer, work experience, educational history, gender, income, money spent on purchases, hobbies, location, age, viewing history, time spent on items, categories of items previously viewed, and purchase history. The LF display assembly may update the presentation of the holographic content in response to the characteristics of the viewer. In some embodiments, a viewer profile store 592 may store the characteristics of a viewer and viewer information inferred by the online system. In some embodiments, the viewer profile may store information provided by one or more client LF display systems which may include provided information and/or information recorded or inferred from a viewer profiling module (e.g., the viewer profiling module 528).

While viewer profiles in the viewer profile store 592 are frequently associated with individuals, allowing individuals to interact with each other via the online system 590, viewer profiles may also be stored for entities such as businesses or organizations. This allows an entity to establish a presence on the online system 590 for connecting and exchanging content with other online system viewers. The entity may post information about itself, about its products or provide other information to viewers of the online system 590 using a brand page associated with the entity's viewer profile. A viewer profile associated with the brand page may include information about the entity itself, providing viewers with background or informational data about the entity. In one embodiment, other viewers of the online system 590 may interact with the brand page (e.g., connecting to the brand page to receive information posted to the brand page or to receive information from the brand page). The viewer profile in the viewer profile store 592 may maintain references to the interactions performed by the corresponding viewer. As described above, any information stored in a viewer profile (e.g., in the viewer profiling module 528) can be used as an input with a machine learning model to create holographic content to display to the viewer.

The content store 594 stores holographic content such as holographic content to be distributed to viewers of the one or more client LF display systems 500A and 500B. Examples of holographic content may range from an advertisement (e.g. promotion of upcoming sale, promotion of brand, etc.) an announcement (e.g., political speech, motivational speech, etc.), a public service alert (e.g., tornado warning, AMBER alert, etc.), information on news (e.g., news headlines, sports scores, etc.), information on weather (e.g., local weather forecast, air quality index, etc.), information on a venue (e.g., box office hours, upcoming show schedule, etc.), information about traffic or travel conditions (e.g., traffic reports, road closures, etc.), information on a business entity (e.g., office directory, hours of operation, etc.), a performance (e.g., concert, play, etc.), artistic content (e.g., sculpture, ceramic, etc.), any other holographic content, or any combination thereof. In some embodiments, online system viewers may create holographic content to be stored by the content store 594. In other embodiments, holographic content is received from third party systems 580 separate from the online system 590. Objects in the content store 594 may represent single pieces of content, or content "items."

The transaction module 596 provides holographic content to the one or more client LF display systems 500A and 500B in exchange for a payment. In one embodiment, the transaction module 596 manages the transaction where holographic content stored in the content store 594 is distributed to the client LF display systems 500A and 500B via the network 570. In one embodiment, the client LF display systems 500A and/or 500B, or a networked entity owner of the client LF display systems 500A and 500B, may provide payment for specific holographic content items, and the transaction may be managed by the transaction module 596. Alternatively, the third party system 580 may provide content from the content store 582 to the LF display systems 500A and/or 500B in exchange for a transaction fee provided to the transaction module 596. In other embodiments, the online system 590 may distribute content to the client LF display systems 500A and 500B directly, with or without the transaction module 596 charging an account of a particular entity. In some embodiments, the client LF display systems 500A and 500B are associated with one or more viewer profiles which are charged with the cost for presentation of the holographic content items by the transaction module 596. In some embodiments, holographic content items may be purchased and used indefinitely or rented for a duration of time. Remuneration in totality or in part collected by the transaction module 596 may then be provided to a provider of the holographic content item. For example, a third party system that provided a holographic advertisement for a product may receive a portion of the remuneration collected from client LF display systems 500A and 500B for product purchases made related to the holographic advertisement.

The content distribution module 598 provides client LF display systems 500A and 500B with holographic content items. The content distribution module 598 may receive a request from the transaction module 596 with a holographic content item to be presented to the client LF display systems 500A and/or 500B. The content distribution module 598 retrieves the holographic content item from the content store 594 and provides the holographic content item to the client LF display systems 500A and/or 500B for display to the viewers.

In some embodiments, the client LF display systems 500A and 500B may record instances of presentation of holographic content dependent in part on whether input is received. In one embodiment, the client LF display systems 500A and 500B may be configured to receive an input in response to presentation of the holographic content. Holographic content may a holographic advertisement for a physical merchandise (e.g., a pair of shoes), a digital asset (e.g., a downloadable album), a service to be rendered (e.g., house painters), other holographic advertisements, or some combination thereof. With holographic advertisements, the inputs received may be used to confirm impressions or reach of holographic advertisements. In some embodiments, the client LF display systems 500A and 500B may confirm an instance of presentation of holographic content if a viewer provides a response to a prompt provided during the presentation of holographic content. For example, the client LF display system 500A receives a vocal input from the viewer (e.g., after being prompted) which is used by the client LF display system 500A to confirm presentation of the holographic content. The client LF display systems 500A and 500B may use a combination of the received inputs with other metrics (e.g., information obtained by the tracking system 550) to confirm instances of presentation of the holographic content. In other embodiments, the client LF display systems 500A and 500B may be configured to update presentation of the holographic content in response to the received input. For example, the client LF display system 500A receives a vocal input from the viewer (e.g., after being prompted) where the viewer expresses an interest in a presented product in the holographic advertisement which is used by the client LF display system 500A to update the holographic content being presented (e.g., provide more pricing information about the product).

In other embodiments with holographic advertisements, the client LF display systems 500A and 500B provide a conversion opportunity to a viewer. In some embodiments, a received input may correspond to a conversion associated with the holographic content. A conversion opportunity is an opportunity for a viewer to respond to the holographic advertisement. Responding to the holographic advertisement may generally correspond to providing an option for the viewer to make a purchase according to what is presented within the holographic advertisement. For example, the client LF display system 500A presents a purchase option to purchase a leather jacket. In other instances, a response to the holographic advertisement may be providing an option for the viewer to inquire for further information according to what is presented within the holographic advertisement. The client LF display systems 500A and 500B may provide a prompt with a presentation of a holographic advertisement. Upon receiving an input to convert after presentation of the holographic advertisement, the client LF display systems 500A and 500B may present subsequent holographic content for completion of the conversion based on the received input. In these cases, the LF processing engine 530 provides follow-up holographic content. In other cases, the client LF display system 500A may direct the viewer to the advertiser to continue with the conversion, e.g., by directing the viewer to a web browser (e.g., on a mobile device or presented by the client LF display system 500A) or by directing the viewer to an application (e.g., on a mobile device). The conversion may by a purchase. Following the example above, the viewer provides the input corresponding to the purchase option, the client LF display system 500A may respond with presenting a holographic purchase page for allowing the viewer to complete the purchase of the leather jacket. In some embodiments, the conversion of an instance of presentation of a holographic advertisement may be recorded by the client LF display system 500A which can be used to process remuneration costs.

In some configurations, the client LF display systems 500A and 500B in the digital signage content distribution system 560 may have different hardware configurations. Holographic content may be presented based on the hardware configuration of the client LF display systems 500A and 500B. Hardware configurations may include a resolution, a number of projected rays per degree, a field of view, a deflection angle on the display surface, and a dimensionality of the display surface. Each hardware configuration may generate, or utilize, sensory data in different data formats. As previously discussed, the holographic content, which includes all sensory data (e.g. holographic, audio, and tactile data) may be transferred to the client LF display systems 500A and 500B as an encoded vectorized format. As such, a LF processing engine (e.g., the LF processing engine 530) for each client LF display system may decode the encoded data for the LF display system on which it will be presented, taking into account the corresponding hardware configuration of the client LF display system 500A or 500B. For example, a first client LF display system 500A may have a first hardware configuration and a second client LF display system 500B may have a second hardware configuration. The first client LF display system 500A may receive the same holographic content as the second client LF display system. Despite differences in the first and second hardware configurations, the LF processing engine of each LF display system 500A and 500B must present the holographic content, possibly at different resolutions, with different fields of view, etc.

Digital Signage Applications

Figure 6:
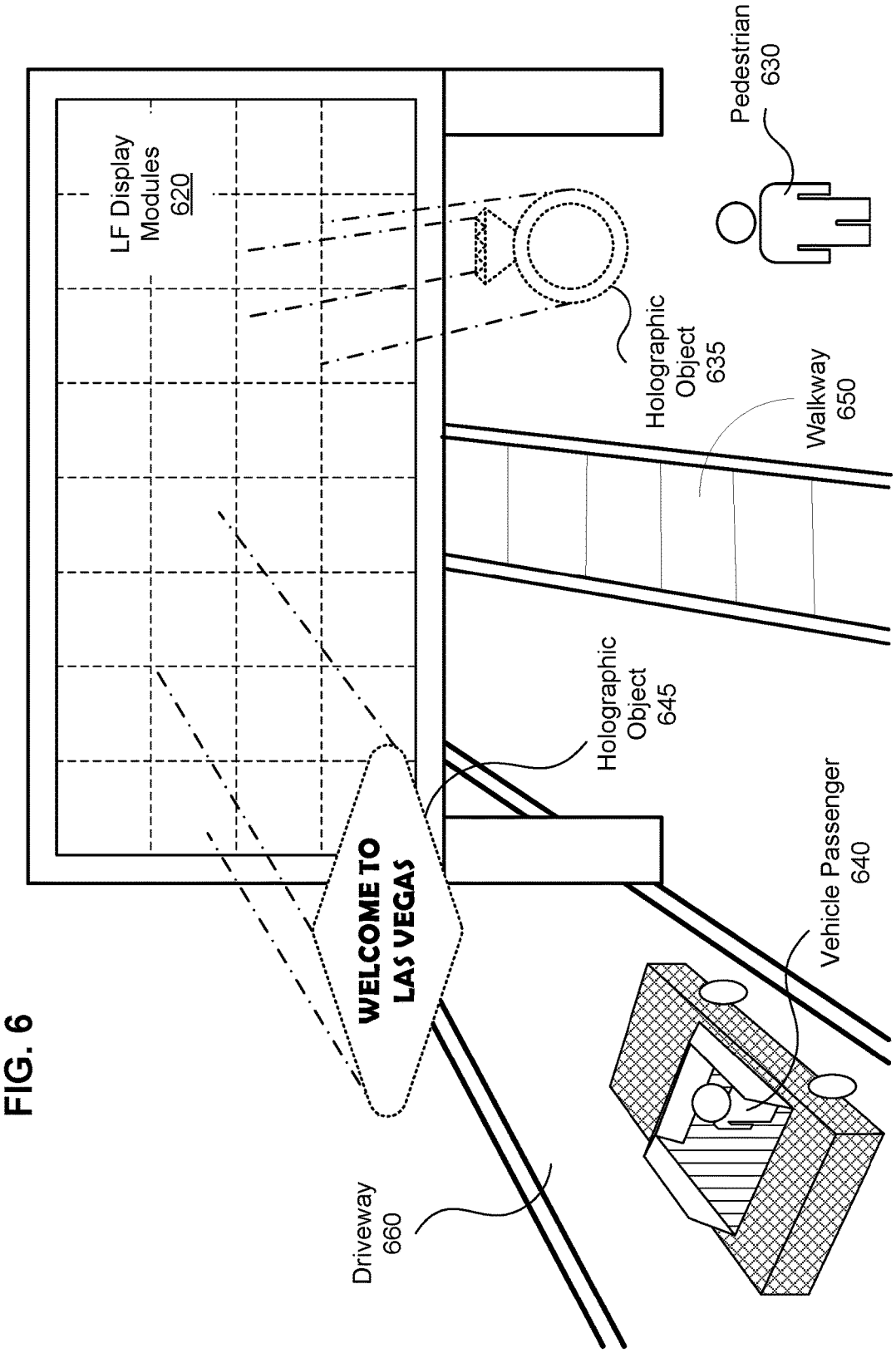
FIG. 6 is an illustration of a light field display system based used in a large-scale signage system, in accordance with one or more embodiments.

FIG. 6 is an illustration of a large-scale LF display system 600 used in a digital signage content distribution system, in accordance with one or more embodiments. The LF display system 600 is an embodiment of the LF display system 500 and the client LF display systems 500A and 500B. The LF display system 600 contains LF display modules 620 of a LF display assembly (an embodiment of the LF display assembly 510) providing holographic content to one or more viewers of the LF display system 600. The LF display system 600 illustrated in FIG. 6 forms a one-sided seamless surface environment; yet in other embodiments, the LF display system 600 may form a multi-sided seamless surface environment. In the illustration of FIG. 6, the LF display system is sized as a billboard hoisted above ground by multiple support structures. The LF display system 600 may be implemented as part of a digital signage content distribution system (e.g., the digital signage content distribution system 560) that controls distribution of holographic content from content providers of an online system (e.g., the online system 590) or from a third party system (e.g., the third party system 580). In one embodiment, the content provider may be a third party system (e.g., an advertising system that generates their own advertisements also referred to as an advertiser or an advertising distribution system that generates advertisements on behalf of one or more advertisers). The third party system may be connected to the LF display system 600 through a network and configured to provide the holographic content to the LF display system 600 for presentation to the viewer.

The LF display system 600 presents holographic content to one or more viewers of the LF display system 600. The LF display system 600 may retrieve the holographic content from a data store (e.g., the data store 522) or from the content provider. Examples of holographic content may range from an advertisement (e.g. promotion of upcoming sale) an announcement (e.g., political speech), a public service alert (e.g., tornado warning), information on news (e.g., news headlines), information on weather (e.g., local weather forecast), information on a venue (e.g., box office hours), information about traffic or travel conditions (e.g., traffic reports), information on a business entity (e.g., office directory), a performance (e.g., concert), artistic content (e.g., sculpture), any other holographic content, or any combination thereof. The LF display system 600 generates display instructions for the holographic content (e.g., via the LF processing engine 530) and more specifically the holographic content to be presented by the LF display modules 620. The LF display system 600 may present the holographic content to be viewable by all viewers within the viewing volume of the LF display system 600 that have an unobstructed view of the holographic content. In other cases, the LF display system 600 tracks at least some, and in some cases all, viewers within the viewing volume. In some embodiments, the LF display system 600 may provide each tracked viewer with specific holographic content that is viewable by that viewer and that specific holographic content would not be visible to other viewers. In other cases, the LF display system 600 may subdivide the viewing volume into different sections, and provide different holographic content to each section. In this manner viewers in different section are presented with different holographic content, and experience holographic content specific to the section they are in. The LF display system 600 may also include a sensory feedback system (e.g., the sensory feedback system 540) for presenting sensory feedback in tandem with the holographic content provided by the LF display modules 620. As holographic content is provided to the viewers, the LF display system 600 may record behavior of viewers in response to the presented holographic content (e.g., via the LF display assembly 510, the sensory feedback system 540, or the tracking system 550). For example, the LF display system 600 may utilize a tracking system (e.g., the tracking system 550) to monitor body movement of a viewer in response to presentation of the holographic content.

In some embodiments, the LF display system 600 presents specific holographic content to different types of viewers of the LF display system 600. A tracking system (e.g., the tracking system 550) may track movement of the viewer within the viewing volume of the LF display system 600 (e.g., the viewer is moving from the left of the LF display system to the right of the LF display system), may monitor responses of the viewer to the holographic content (e.g., the viewer is laughing), and may determine characteristics of the viewer within the viewing volume of the LF display system (e.g., the viewer is female).

Tracking the movement of the viewer by the tracking system may further determine a speed based on movement by each viewer. For example, tracked movement may include a speed of the viewer moving within the viewing volume. The LF display system may update presentation of the holographic content based on the speed of the viewer. In the example of FIG. 6, the tracking system may determine that pedestrian 630 is a viewer that is moving slowly (e.g., slower than five miles per hour). The tracking system may categorize the pedestrian 630 then as a pedestrian. According to the viewer's type determined as pedestrian, the LF display system 600 may present a holographic object 635 assigned for presentation to the pedestrian type. The LF display system 600 may designate each holographic object in the data store (e.g., the data store 522) for presentation to each of the types of viewers. The LF display system 600 presents holographic content at a position in the holographic object volume in front of the viewer based on the speed of the viewer. For example, based on the position and movement of pedestrian 630 tracked by the tracking system, the LF display system 600 may update presentation of the holographic object 635 to always be presented in front of the pedestrian 630 while potentially walking or moving around the viewing volume.

The tracking system may categorize a vehicle passenger as vehicle passenger 640. The tracking system may determine the vehicle passenger 640 as another type of viewer different from the pedestrian 630. The tracking system may determine that the vehicle passenger 640 is inside a vehicle. Additionally, the tracking system may determine that the vehicle passenger 640 is traveling at a faster speed than the pedestrian 630 (e.g., greater than five miles per hour). The LF display system 600 determines a holographic object 645 to provide to the vehicle passenger 640 assigned for presentation to the vehicle passenger type. For example, the LF display system 600 may designate less chaotic holographic content (e.g., name and location of nearby restaurant, movie poster for upcoming or already released movie) to provide to vehicle passengers so as to avoid overly distracting the vehicle's driver. The LF display system 600 may also update presentation of the holographic object 645 to be viewable by the vehicle passenger 640 throughout movement within the viewing volume. In other embodiments, upon determining that the vehicle passenger 640 is a vehicle passenger type of viewer, the LF display system 600 presents the holographic object 645 at a fixed position in the viewing volume similarly to avoid overly distracting the vehicle's driver. In some embodiments, the tracking system may further differentiate between a driver of a vehicle and passengers of the vehicle by establishing a viewer's position within the vehicle as determinate (at least in part) of whether the viewer is either a driver or a passenger. Once differentiated, the LF display system 600 may present holographic content designate for the vehicle driver type that may include holographic content that is less distracting (e.g., more static, less chaotic, at a fixed position in the viewing volume) while providing other passengers of a vehicle passenger type with holographic content that is available for presentation to the vehicle passengers.

The tracking system may monitor responses of the viewer to the holographic content. Monitored responses may include a position of the viewer in the viewing volume, a movement of the viewer, a gesture of the viewer, a facial expression of the viewer, a gaze of the viewer, some other monitored response, or some combination thereof. The LF display system 600 may update the holographic content presented to the viewer in response to the monitored responses of the viewer. For example, in FIG. 6, the viewer (i.e. the pedestrian 630) changes their gaze from directing their eyes towards the right of the LF display modules 620 to directing their eyes towards the left of the LF display modules 620. The tracking system monitors the viewer's gaze and updates the holographic content accordingly (i.e., the holographic object 635 is presented at a position in the holographic object volume that intersects with the gaze of the viewer). The monitored responses of the viewers may be shared with a device on a network. For instance, the monitored response may be shared with a device (e.g., a computer, a server, etc.) on a network (e.g., the network 570).

The tracking system may determine characteristics of the viewer within the viewing volume of the LF display system 600. The determined characteristics of the viewer describe the viewer's features or qualities. The determined characteristics may include demographic information of the viewer, work experience, educational history, gender, income, money spent on purchases, hobbies, location, age, viewing history, time spent on items, categories of items previously viewed, purchase history, some other feature or quality of the viewer, or some combination thereof. The LF display system 600 may update the holographic content presented to the viewer in response to the determined characteristics of the viewer. For example, in FIG. 6, the viewer (i.e. the pedestrian 630) is determined to be a male child in middle school. The holographic content is updated accordingly (i.e., the holographic object 635 changes from the currently displayed diamond ring to an action figure). The determined characteristics of the viewers may be shared with a device on a network. For instance, the monitored response may be shared with a device (e.g., a computer, a server, etc.) on a network (e.g., the network 570).

In some embodiments, the holographic objects 635 and/or 645 may be holographic advertisements provided to the viewers—i.e. the pedestrian 630 and the vehicle passenger 640. Accordingly, the LF display system 600 records the instances of presentation of the holographic advertisements to the viewers. The holographic advertisements may be for digital assets or physical goods and services such as holographic movies, holographic shows, holographic merchandise, etc. In the illustration of FIG. 6, the holographic object 635 as an example of a holographic advertisement is a diamond ring that is a holographic advertisement for a jewelry shop. In other embodiments, the holographic objects 635 and/or 645 may be informational panels providing information to their respective viewers. The information may include but is not limited to a welcome sign, a name of an establishment, a map with directions, locations of various things (e.g., objects, stores, restaurants, and bathrooms), etc. In the illustration of FIG. 6, the holographic object 645 as an example of a billboard LF display surface of a welcome sign to the city of Las Vegas.

In some embodiments, the LF display system 600 determines classifies various sections of the viewing volume. In the illustration of FIG. 6, the LF display system 600 is placed on a walkway 650 allowing viewers to pass underneath the LF display modules 620. The LF display system 600 is also placed next to a driveway 660 where motorized vehicles may pass next to the LF display system 600. In one or more embodiments, the LF display system 600 implements an AI model to classify various sections of the viewing volume. The tracking system may provide tracking information of various objects and viewers within the viewing volume. The LF display system 600, based on the tracking information, may determine that one section of the viewing volume is the walkway 650 with viewers that may be pedestrians or bikers and most likely not in many motorized vehicles. The LF display system 600 may then determine another section of the viewing volume is the driveway 660 with viewers that may be passengers of motorized vehicles. According to the classified sections of the viewing volume, the LF display system 600 may provide holographic content according to the sections. For example, the LF display system 600 may provide a holographic sign fixed at a position for viewers (i.e. drivers or passengers in vehicles) in the driveway 660 to see while providing specific holographic advertisements to each viewer moving within the walkway 650.

Figure 7:
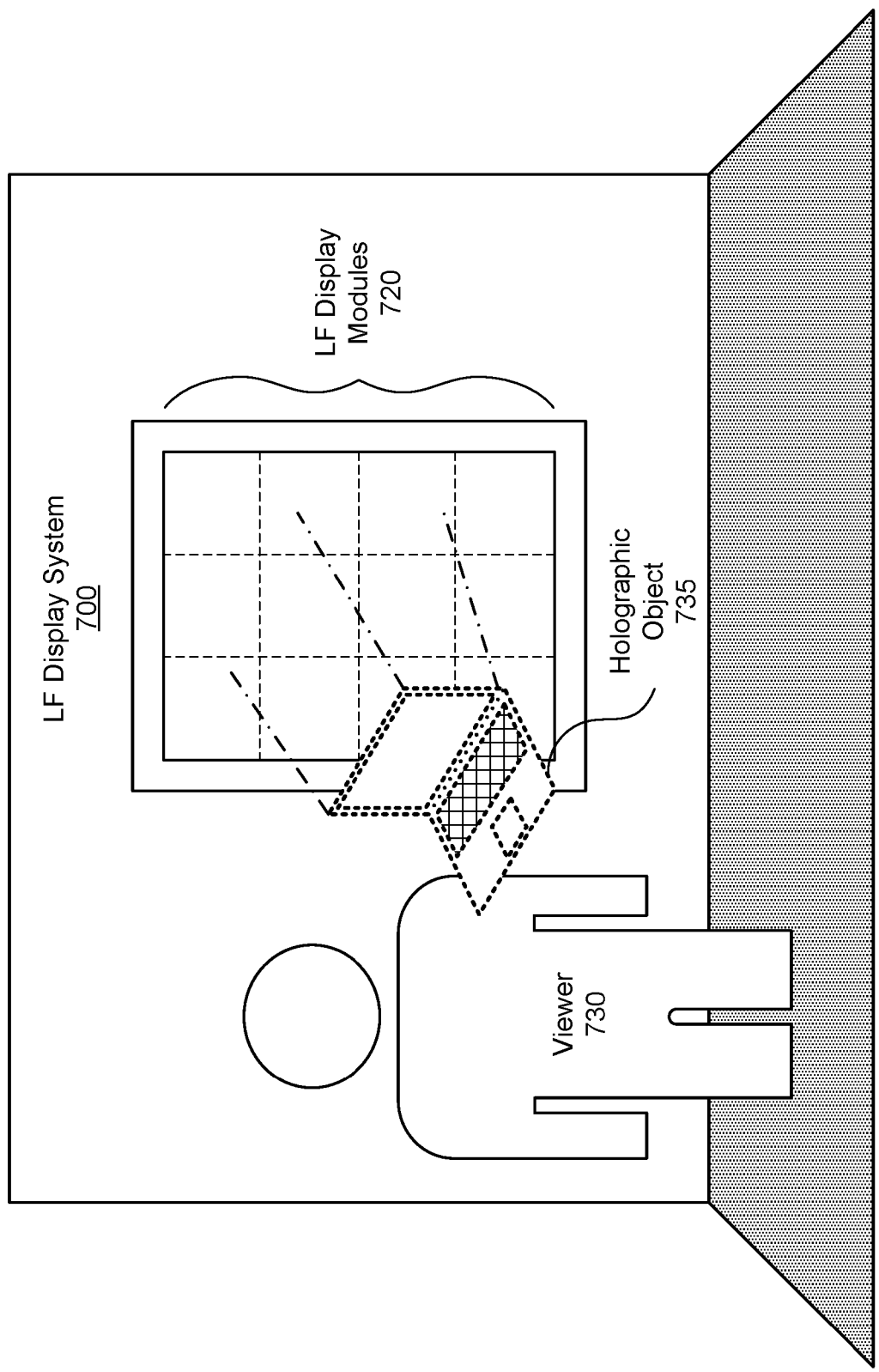
FIG. 7 is an illustration of a light field display system based used in a small-scale signage system, in accordance with one or more embodiments.

FIG. 7 is an illustration of a LF display system 700 used in a small-scale signage system (e.g., a panel LF display surface), in accordance with one or more embodiments. The LF display system 700 is an embodiment of the LF display system 500. The LF display system 700 contains LF display modules 720 of a LF display assembly (an embodiment of the LF display assembly 510) providing holographic content to one or more viewers of the LF display system 700. The LF display system 700 illustrated in FIG. 7 forms a one-sided seamless surface environment; yet in other embodiments, the LF display system 700 may form a multi-sided seamless surface environment. In the illustration of FIG. 7, the LF display system is sized as similarly to an average viewer. The LF display system 700 may be implemented as part of a LF digital signage environment that controls distribution of holographic advertisements from content providers.

The LF display system 700 identifies a viewer 730 of the LF display system 700. The LF display system 700 uses a viewer profiling module (e.g., the viewer profiling system 528) to identify the viewer 730. In some embodiments, the viewer profiling module uses image recognition techniques with captured image data of the viewer 730. In other embodiments, the viewer profiling module further employs identification scanners that can scan for a physical identification token of the viewer 730. For example, the viewer 730 may be at an amusement park with a RFID wristband that can be scanned by one or more RFID scanners part of the viewer profiling module. The LF display system 700 can then access the viewer's viewer profile in a data store (e.g., the data store 522). The viewer profile may comprise various characteristics or information about the viewer. The characteristics may include provided or inferred preferences from monitored behavior. Information may further comprise historical logs such as holographic content already previously presented to the viewer 730. The LF display system 700 may then choose a holographic object 725 to present to the viewer 730.

A tracking system (e.g., the tracking system 550) tracks the viewer 730 whilst providing holographic content to the viewer 730. The tracking system may constantly monitor a position of the viewer 730, a gaze of the viewer 730, or a combination thereof. The LF display system 700 may update presentation of the holographic content according to the tracking information. For example, the LF display system 700 may determine that the viewer 730 is moving from one side of the LF display system 700 to another side. In response to the determined movement of the viewer 730, the LF display system 700 may update presentation of the holographic object 735 to move with the viewer 730 from one side to the other side. In another example, the viewer 730 may be standing approximately perpendicular to the LF display modules 720. As the viewer 730 shifts their gaze, the tracking system can monitor the viewer response and record the gaze. Based on the recorded gaze, the LF display system 700 may update presentation of the holographic object 735 to follow the gaze of the viewer 730, e.g., present modified holographic content at a position in the holographic object volume that intersects with the gaze of the viewer 730.

In one or more embodiments, the LF display system 700 includes a sensory feedback system (e.g., the sensory feedback system 540) to provide sensory feedback with the holographic content. The sensory feedback system may generate the sensory feedback according to parameters stored in a data store (e.g., the data store 522). In some instances, each holographic object may have parameters that dictate presentation of sensory feedback in tandem with the presentation of the holographic object by the LF display modules 720. For example, when presenting a holographic chicken, the sensory feedback system may receive instructions including sensory feedback parameters to present a tactile texture of feathers in proximity to the position of the holographic chicken in the viewing volume. Additionally, the sensory feedback system may provide audio feedback corresponding to chicken sounds (e.g., bach bach bach). The viewer 730 may then perceive the sensory feedback providing a more immersive experience and interaction with the holographic object 735.

In some embodiments, the LF display system 700 is configured to receive input from the viewer 730. The input may be received via any combination of the LF display modules 720, a sensory feedback system (e.g., the sensory feedback system 540), a tracking system (e.g., the tracking system 550), a viewer profiling module (e.g., the viewer profiling system 528), and any additional input devices. The input received may include but is not limited to audio inputs (e.g., voice input from the viewer), tracking inputs (e.g., gestures by the viewer tracked from the tracking system), button inputs (e.g., buttons pressed on a remote control, or a touchscreen display, etc.), or any combination thereof. In response to received input, the LF display system 700 can update presentation of the holographic content. In some cases, the LF display system 700 may associate some inputs for modifying display of the holographic content presented by the LF display system 700 including the holographic content presented by the LF display modules 720 or sensory feedback content provided by the sensory feedback assembly.

In embodiments with holographic advertisements presented by the LF display system 700, the LF display system 700 may receive input to convert the presentation of the holographic advertisement. When presenting the holographic advertisement, the LF display system 700 may also present an option to the viewer 730 as a conversion opportunity. The viewer 730 may provide the input to the LF display system 700. For example, the LF display system 700 prompts the viewer 730 to raise their hand if the viewer 730 wishes to purchase the holographic object 735. The tracking system may track the viewer 730 and determine that the viewer 730 has raised their hand. The raised hand is received as input by the tracking system 730. In response, the LF display system 700 presents additional holographic content to process conversion of the holographic advertisement. For example, the LF display system 700 may present a holographic web page for allowing the viewer 730 to complete their purchase of the holographic object 735.

In one or more embodiments, the holographic object 735 is a holographic advertisement presented to the viewer 730. Accordingly, the LF display system 700 records the instances of presentation of the holographic advertisements to the viewer 730. The holographic advertisements may be for digital assets or physical goods and services, holographic movies, holographic shows, other holographic content, etc. In other embodiments, the holographic objects 735 may be informational panels providing information to their respective viewers. The information may include but is not limited to a welcome sign, a name of an establishment, a map with directions, locations of various things (e.g., objects, stores, restaurants, and bathrooms), etc.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field (LF) display system comprising:
  a controller configured to generate holographic content;
  a LF display assembly comprising one or more LF display modules that are configured to present the holographic content in a holographic object volume to a viewer located in a viewing volume in a public setting, and wherein each of the one or more LF display modules comprises:
an energy device layer that is configured to provide a plurality of energy source locations;
an energy waveguide layer with a plurality of energy waveguides, with each waveguide configured to project energy from at least one energy source location into at least one specific direction from a display surface depending on the energy source location, in accordance with a four-dimensional light field function, to form a holographic object by focusing energy waves within the holographic object volume where the holographic object is located therein, whereby the viewer located within the viewing volume is able to focus the viewer's eyes on the holographic object
wherein the holographic object comprises convergence of energy waves in the holographic object volume and are formed without rendering two-dimensional perspective images.

2. The LF display system of claim 1, wherein the one or more LF display modules are further configured to present additional holographic content in the holographic object volume to a second viewer located in a second viewing volume different from the viewing volume.

3. The LF display system of claim 2, further comprising a tracking system configured to track movement of viewers, wherein the viewing volume and the second viewing volume are defined based on the tracked movement of viewers.

4. The LF display system of claim 1, further comprising a tracking system that is configured to do one or more of:
track movement of the viewer within the viewing volume of the LF display system, wherein the tracked movement includes a speed of the viewer moving within the viewing volume;
monitor responses of the viewer to the holographic content; and
determine characteristics of the viewer within the viewing volume of the LF display system, and
wherein the LF display assembly is configured to update presentation of the holographic content based on the speed of the viewer.

5. The LF display system of claim 4, wherein the monitored response of the viewer includes a gaze of the viewer, and wherein the LF display assembly is configured to present the holographic content based on the gaze of the viewer.

6. A light field (LF) display system comprising:
a controller configured to generate holographic content;
a LF display assembly comprising one or more LF display modules that are configured to present the holographic content in a holographic object volume to a viewer located in a viewing volume in a public setting, and
wherein each of the one or more LF display modules has a display surface from where a holographic object is projected within a holographic object volume, whereby the viewer located within the viewing volume is able to focus the viewer's eyes on the holographic object, wherein a seamless display surface is formed by tiling the display surfaces of the one or more LF display modules;
wherein the holographic object comprises convergence of energy waves in the holographic object volume and are formed without rendering two-dimensional perspective images.

7. The LF display system of claim 6, wherein the one or more LF display modules are further configured to present additional holographic content in the holographic object volume to a second viewer located in a second viewing volume different from the viewing volume.

8. The LF display system of claim 7, further comprising a tracking system configured to track movement of viewers, wherein the viewing volume and the second viewing volume are defined based on the tracked movement of viewers.

9. The LF display system of claim 6, further comprising a tracking system that is configured to do one or more of:
track movement of the viewer within the viewing volume of the LF display system, wherein the tracked movement includes a speed of the viewer moving within the viewing volume;
monitor responses of the viewer to the holographic content; and
determine characteristics of the viewer within the viewing volume of the LF display system, and
wherein the LF display assembly is configured to update presentation of the holographic content based on the speed of the viewer.

10. The LF display system of claim 9, wherein the monitored response of the viewer includes a gaze of the viewer, and wherein the LF display assembly is configured to present the holographic content based on the gaze of the viewer.

* * * * *